US012591348B2

(12) United States Patent
Ji et al.

(10) Patent No.: US 12,591,348 B2
(45) Date of Patent: Mar. 31, 2026

(54) ELECTRONIC DEVICE FOR CONTROLLING DISPLAY OF MULTIPLE WINDOW, OPERATION METHOD THEREOF, AND STORAGE MEDIUM

(71) Applicant: Samsung Electronics Co., Ltd., Suwon-si (KR)

(72) Inventors: Sungwook Ji, Suwon-si (KR); Taehyun Kang, Suwon-si (KR); Inyoung Choi, Suwon-si (KR); Jihea Park, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 105 days.

(21) Appl. No.: 18/217,196

(22) Filed: Jun. 30, 2023

(65) Prior Publication Data

US 2024/0019975 A1     Jan. 18, 2024

Related U.S. Application Data

(63) Continuation of application No. PCT/KR2023/007784, filed on Jun. 7, 2023.

(30) Foreign Application Priority Data

Jul. 13, 2022     (KR) ........................ 10-2022-0086483

(51) Int. Cl.
*G06F 3/0481*          (2022.01)
(52) U.S. Cl.
CPC .. *G06F 3/0481* (2013.01); *G06F 2203/04803* (2013.01); *G06F 2203/04804* (2013.01)
(58) Field of Classification Search
CPC ......... G06F 3/0481; G06F 2203/04803; G06F 2203/04804
See application file for complete search history.

(56) References Cited

U.S. PATENT DOCUMENTS 8,495,514 B1 *   7/2013   Ludolph ............... G06F 3/0481
                                                           715/810
9,666,158 B2    5/2017   Kang et al.
                        (Continued)

FOREIGN PATENT DOCUMENTS

KR       20140116656 A     10/2014
KR       20140141269 A     12/2014
                        (Continued)

OTHER PUBLICATIONS

International Search Report and Written Opinion for International Application No. PCT/KR2023/007784; International Filing Date Jun. 7, 2023; Date of Mailing Aug. 25, 2023; 10 Pages.
(Continued)

*Primary Examiner* — Mahelet Shiberou
(74) *Attorney, Agent, or Firm* — CANTOR COLBURN LLP

(57) ABSTRACT

According to an embodiment, an electronic device may comprise a display and at least one processor. According to an embodiment, the at least one processor may be configured to display a first window of an application through the display. According to an embodiment, the at least one processor may be configured to, based on a first input, display a second window on a first partial area of the first window to hide the first partial area of the first window. According to an embodiment, the at least one processor may be configured to, based on a second input through the first window, display the hidden first partial area of the first window. According to an embodiment, the at least one processor may be configured to, in response to the second input being released, display the second window to hide the first partial area of the first window.

14 Claims, 17 Drawing Sheets

(56)                    References Cited

U.S. PATENT DOCUMENTS

| | | | | |
|---|---|---|---|---|
| 10,055,101 | B2 * | 8/2018 | Namgung | G06F 3/0488 |
| 11,011,138 | B2 | 5/2021 | Kim et al. | |
| 11,048,372 | B2 * | 6/2021 | Revach | G06F 3/04842 |
| 11,487,398 | B1 * | 11/2022 | Wei | G09G 5/14 |
| 2011/0107212 | A1 * | 5/2011 | Jeong | G06F 3/0481 |
| | | | | 715/702 |
| 2011/0244924 | A1 | 10/2011 | Jung et al. | |
| 2012/0297336 | A1 | 11/2012 | Lin et al. | |
| 2013/0104065 | A1 | 4/2013 | Stecher | |
| 2014/0033119 | A1 | 1/2014 | Kim et al. | |
| 2014/0359443 | A1 | 12/2014 | Hwang | |
| 2015/0020012 | A1 * | 1/2015 | Wang | G06F 3/04886 |
| | | | | 715/768 |
| 2016/0148598 | A1 * | 5/2016 | Kim | H04M 1/72403 |
| | | | | 345/173 |
| 2016/0154536 | A1 | 6/2016 | Kim et al. | |
| 2016/0370864 | A1 | 12/2016 | Choi et al. | |
| 2017/0277413 | A1 | 9/2017 | Kim et al. | |
| 2017/0285933 | A1 * | 10/2017 | Oh | G06F 3/04847 |
| 2017/0308261 | A1 * | 10/2017 | Lee | H04N 21/4438 |
| 2020/0402445 | A1 | 12/2020 | Yang et al. | |
| 2021/0240309 | A1 | 8/2021 | Kim et al. | |
| 2021/0398085 | A1 * | 12/2021 | Paul | G06F 3/04847 |
| 2021/0405850 | A1 * | 12/2021 | Schneiter | G06F 8/38 |

FOREIGN PATENT DOCUMENTS

| | | |
|---|---|---|
| KR | 20150069179 A | 6/2015 |
| KR | 20170111250 A | 10/2017 |
| KR | 102148725 B1 | 8/2020 |
| KR | 20200100581 A | 8/2020 |
| KR | 102289786 B1 | 8/2021 |

OTHER PUBLICATIONS

Extended European Search Report Issued In EP Application No. 23839809.3-1218; Mail Date May 9, 2025; 08 Pages.

* cited by examiner

101

ELECTRONIC DEVICE FOR CONTROLLING DISPLAY OF MULTIPLE WINDOW, OPERATION METHOD THEREOF, AND STORAGE MEDIUM

CROSS-REFERENCE TO RELATED APPLICATIONS

This application is a continuation application of International Application No. PCT/KR2023/007784, filed on Jun. 7, 2023, which claims priority to Korean Patent Application No. 10-2022-0086483, filed on Jul. 13, 2022, in the Korean Intellectual Property Office, the disclosures of which are incorporated by reference herein in their entireties.

TECHNICAL FIELD

An embodiment of the disclosure relates to an electronic device for controlling the display of a multiple window, an operation method thereof, and storage medium.

BACKGROUND ART

An electronic device may store various types of applications, execute an application for providing a specific service, and display graphic elements interactable with the user on the execution screen of the application.

As equipped with various applications, an electronic device may display the execution screens of the applications in two or more windows without inconvenience to the user's use of multitasking. The user may perform a different task on each window and may move, resize, or overlay each window on another. In particular, the always on top (AOT) function may provide a view that is always on regardless of the screen of another program or application. For example, if another function provided by the application being used by the user is executed while displaying the window of the application, a sub window may typically be overlaid in a specific position to hide the application window being currently displayed. Accordingly, easier control of a multiple window may lead to easier use of the application by the user, increasing user convenience and satisfaction.

DISCLOSURE

Means to Address the Problems

According to an embodiment, an electronic device 101 may comprise a display 160 or 260 and at least one processor 120 or 220. According to an embodiment, the at least one processor may be configured to display a first window of an application through the display. According to an embodiment, the at least one processor may be configured to, based on a first input, display a second window on a first partial area of the first window. According to an embodiment, the at least one processor may be configured to, based on a second input through the first window, display the hidden first partial area of the first window. According to an embodiment, the at least one processor may be configured to, in response to the second input being released, display the second window to hide the first partial area of the first window.

According to an embodiment, a method for controlling display of a multiple window by an electronic device 101 may comprise displaying a first window of an application through a display 160 or 260 of the electronic device. According to an embodiment, the method may comprise, based on a first input, displaying a second window on a first partial area of the first window to hide the first partial area of the first window. According to an embodiment, the method may comprise, based on a second input through the first window, displaying the hidden first partial area of the first window. According to an embodiment, the method may comprise, in response to the second input being released, displaying the second window to hide the first partial area of the first window.

According to an embodiment, a non-volatile storage medium may store instructions configured to, when executed by at least one processor 120 or 220 of an electronic device 101, enable the electronic device to perform at least one operation. The at least one operation may comprise displaying a first window of an application through a display 160 or 260 of the electronic device. According to an embodiment, the at least one operation may comprise based on a first input, displaying a second window on a first partial area of the first window to hide the first partial area of the first window. According to an embodiment, the at least one operation may comprise, based on a second input through the first window, displaying the hidden first partial area of the first window. According to an embodiment, the at least one operation may comprise, in response to the second input being released, displaying the second window to hide the first partial area of the first window.

DESCRIPTION OF THE DRAWINGS

The same or similar reference denotations may be used to refer to the same or similar elements throughout the specification and the drawings.

DETAILED DESCRIPTION

Figure 1:
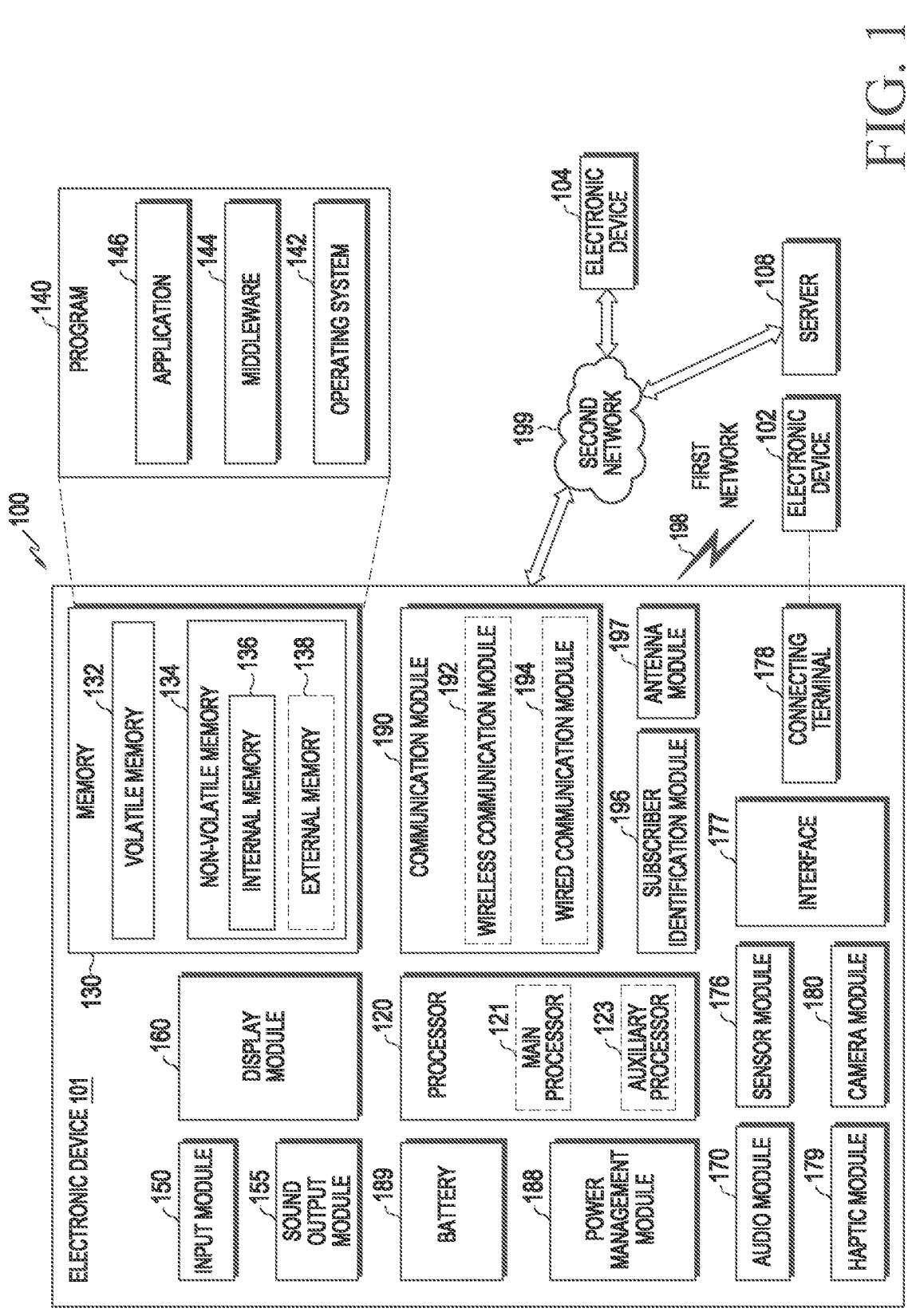
FIG. 1 is a block diagram illustrating an electronic device in a network environment according to an embodiment.

FIG. 1 is a block diagram illustrating an electronic device 101 in a network environment 100 according to various embodiments. Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor

121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™ wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductive body or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2:
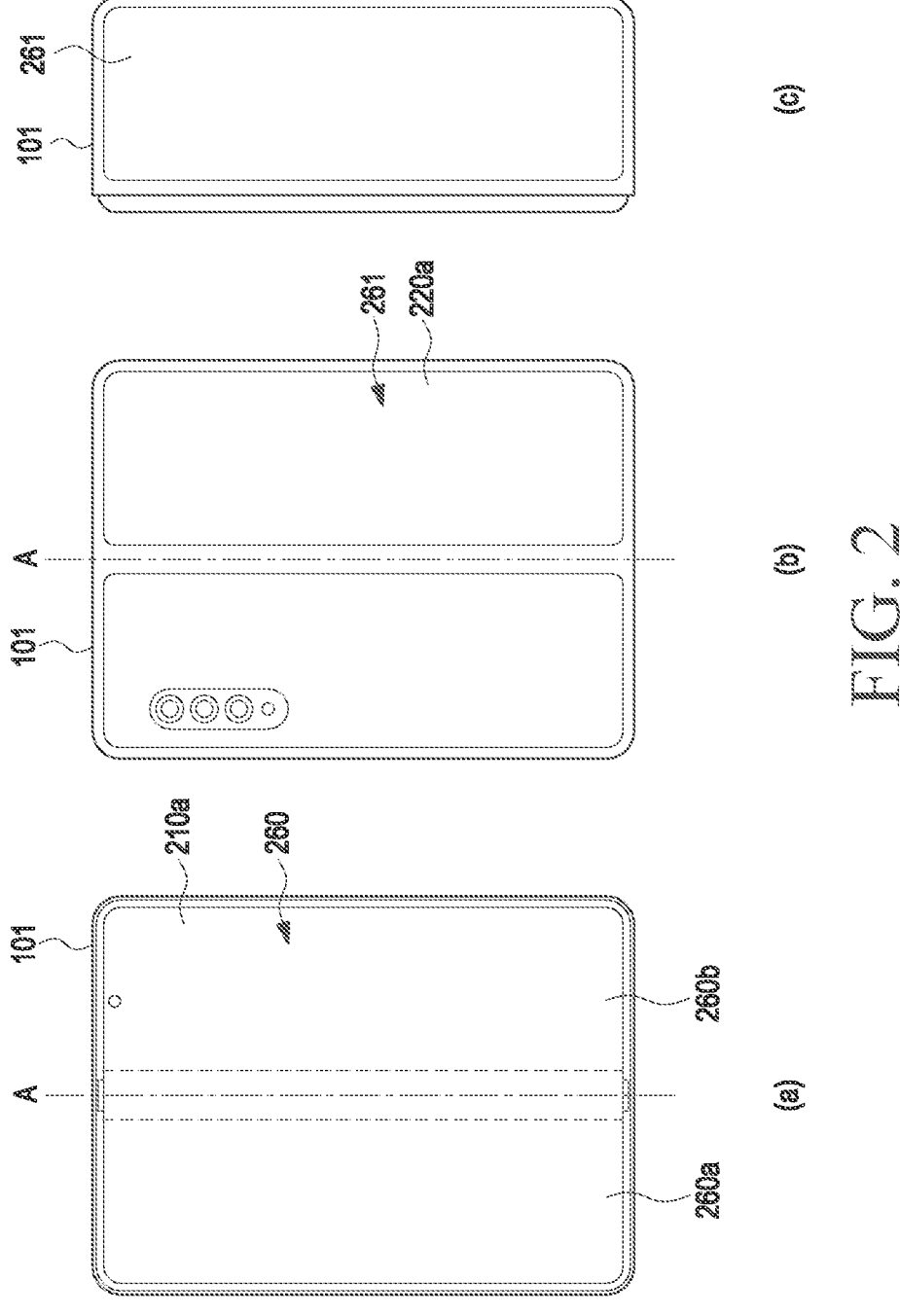
FIG. 2 is a view illustrating an unfolded state and a folded state of an electronic device according to an embodiment.

FIG. 2 is a view illustrating an unfolded state and a folded state of an electronic device according to an embodiment.

Referring to FIG. 2, in an embodiment, an electronic device 101 may include a foldable housing and a flexible or foldable display 260 disposed in a space formed by the foldable housing. The foldable housing may have a substantially symmetrical shape about a folding axis (e.g., axis A). According to an embodiment, the surface where the flexible display 260 is disposed may be defined as a first surface 210a of the electronic device 101, and the surface opposite to the first surface 210a may be defined as a second surface 220a.

As shown in view (a) of FIG. 2, the first display 260 may be formed to occupy the entire first surface 210a of the electronic device 101 and, as shown in view (b) of FIG. 2, the second display 261 may be formed to occupy at least a portion of the second surface 220a. In this case, the first display 260 may pivot through a separate hinge module, and the second display 261 may be fixed to the housing.

For example, the second display 261 may be disposed on any one of a pair of housings disposed on two opposite sides with respect to a folding axis (e.g., axis A). According to an embodiment, the first display 260 may mean a flexible display at least a portion of which may be transformed into a flat or curved surface. The first display 260 may include a first area 260a disposed on one side of the folding axis (e.g., axis A) and a second area 260b disposed on the opposite side of the folding axis.

For example, when the electronic device 101 is in an unfolded state (e.g., a flat state), the surface of the first area 260a and the surface of the second area 260b may form 180 degrees there between and face in the same direction (e.g., the forward direction of the electronic device 101).

As shown in view (c) of FIG. 2, when the electronic device 101 is in a folded state, the surface of the first area 260a and the surface of the second area 260b of the first display 260 may face each other while forming a narrow angle (e.g., an angle between 0 and 10 degrees) therebetween. According to an embodiment, in the folded state of the electronic device 101, the second display 261 may be disposed on any one of the pair of housings disposed on two opposite sides of the folding axis (e.g., axis A), but this is an example, and the second display 261 may configure most of the rear surface 220a depending on the structure or function. For example, the electronic device 101 may include the second display 261 at least a portion of which is visually exposed through the rear cover. Accordingly, it should be noted that the size and shape of the first display 260 and the second display 261 are not limited thereto. For example, the electronic device 101 may include three or more displays. First display and second display according to an embodiment described below may mean two displays facing in a first direction and a direction opposite to the first direction among the three or more displays.

Although the electronic device 101 of FIG. 2 has been described above in connection with an example in which the electronic device 101 of FIG. 1 is an electronic device including a foldable display, embodiments of the disclosure are not limited thereto. According to an embodiment, the electronic device 101 of FIG. 1 may include an electronic device including a flexible display that is resizable. For example, the electronic device 101 of FIG. 1 may include a rolling-type electronic device with a display rollable along a guiding member, e.g., a roller, and a sliding-type electronic device with a slidable display. In the following embodiments, it should be noted that an electronic device in the unfolded state is primarily described, and the following description may also apply to other types of electronic devices unless mentioned otherwise.

In the following description, the components easy to understand from the description of the above embodiments are denoted with or without the same reference numerals and their detailed description may be skipped. According to an embodiment of the disclosure, an electronic device 101 may be implemented by selectively combining configurations of different embodiments, and the configuration of one embodiment may be replaced by the configuration of another embodiment. However, it is noted that the present invention is not limited to a specific drawing or embodiment.

Figure 3:
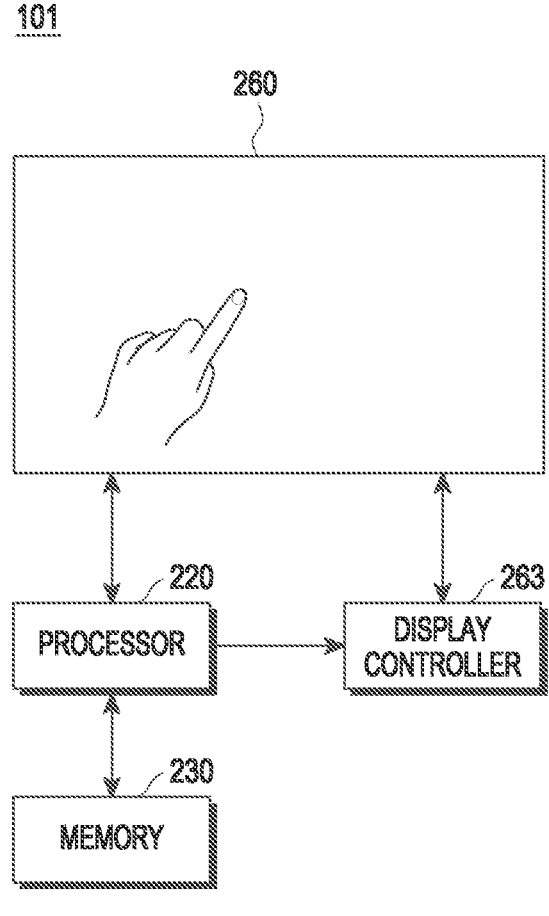
FIG. 3 is a block diagram illustrating an internal configuration of an electronic device according to an embodiment.

FIG. 3 is a block diagram illustrating an internal configuration of an electronic device according to an embodiment.

The electronic device 101 of FIG. 3 may include components identical or similar to those of the electronic device 101 of FIG. 1. Not all of the components of FIG. 3 are essential ones of the electronic device 101 but the electronic device 101 may be implemented with more or less than the components of FIG. 3.

Referring to FIG. 3, a display 260 (e.g., the display module 160 of FIG. 1) for detecting an input by a stylus pen or an input by the user's body (e.g., a finger) may be provided to the electronic device 101 (e.g., the electronic device 101 of FIG. 1). The display 260 may be the display module 160 described above in connection with FIG. 1.

The display 260 may simultaneously support input/output functions of data and may detect touches. According to an embodiment, the display 260 may include a sensing panel, a display panel, and/or the display controller 263. According to an embodiment, the display 260 may be referred to as a touchscreen. The sensing panel may detect contact or proximity of a finger or an input device (e.g., a stylus pen). For example, the sensing panel may detect a hovering input by the input device, and it may transfer an input signal corresponding to the hovering input to the processor 220 (e.g., the processor 120 of FIG. 1). Further, the sensing panel may detect the position of a touch input by a finger or an input device, and the display panel may output an image. The display controller 263 may be a driving circuit that controls the display panel to output an image through the display panel.

When implemented in the form of a touchscreen, the display 260 may display various pieces of information generated according to the user's touch.

Two or more windows may be displayed on the display 260, and at least one of the windows may be a sub window that is displayed in a smaller size than the area of the display 260. The sub window may be configured with the AOT function to provide a view that is always floating on the other windows. Hereinafter, the window displayed on the entire area of the display 260, other than the sub window displayed at the top, of the multiple window, may be referred to as a main window.

According to an embodiment, the multiple window may include a main window and a sub window and may be referred to as a modal window. The modal window may refer to a window requiring the user's interaction before returning from the child window to the parent window in the user interface design concept.

Here, the main window may correspond to the task performed in the foreground environment. For example, the main window may include data that is generated as an application (or task) is executed and may refer to an image output on the display 260 by the application performed in the foreground environment. The main window corresponding to the application may also be referred to as a parent window.

Further, as functions (or items) provided by the application are selected while the application is running, the sub window may be overlaid on a partial area of the main window. The sub window may correspond to a task related to the application. For example, one application may be composed of a plurality of tasks. Similar to the task, a process or thread may also be a portion of a program executable standalone.

According to an embodiment, the functions (or items) provided by the application may be items included on the main window. As the sub window is invoked as an item on the main window is selected, the sub window may be referred to as a child window. Further, the child window overlaid on the main window may include items for providing sub functions of the functions provided by the application. Accordingly, when an item of a sub function on the child window is selected, a sub child window of the child window may be displayed to hide at least a portion of the child window.

In an embodiment, the sub window is one for deploying the lower functions (or items) of the application and may be understood in the same concept as layer. There may be a plurality of layers depending on the depth of the function providable by the application.

According to an embodiment, the memory 230 may be electrically connected to the processor 220 and store at least one application.

According to an embodiment, the memory 230 may store a control program for controlling the electronic device 101, a user interface (UI) related to an application downloaded from the outside or provided by the manufacturer and images for providing the UI, user information, documents, databases, or related data.

According to an embodiment, the processor 220 may execute at least one application in response to a user input. The processor 220 may display the execution screen of the application by using a floating main window to occupy the entire display 260. The main window may be defined as a predetermined space created as an application is executed, and content corresponding to the application may be visually output through the display 260. According to an embodiment, the main window may include at least one of data objects, e.g., video data, audio data, or display information, created as the application is executed. Accordingly, the main window may correspond to the data related to the running application, screen data, and application execution screen.

For example, if an application is executed by a user input, the processor 220 may create a predetermined space called 'window' and configure a screen for the application in the space. According to an embodiment, each application may be controlled so that an image or predesignated color distinguished from the background is displayed through a window, through window attribute settings.

In this case, in the main window, the execution screen of the application currently running on the electronic device 101 is displayed through the entire area of the display 260, and thus, the user may view the execution screen and manipulate a specific item (or button) displayed on the execution screen (or main window).

According to an embodiment, the processor 220 may receive a selection for any one of the items included in the main window. For example, the processor 220 may detect a selection of an item (e.g., icon, text, or number) on the main window. Here, the selection may include a touch input (e.g., by finger or stylus pen) hovering or a touch event.

The processor 220 may display a sub window providing detailed information related to the selected item, based on the selection. Since the sub window is displayed on one area of the main window, the area of the main window may be hidden. When the sub window related to the main window is in a floating state as a modal window, as described above, the user may identify detailed information related to the application through the sub window. However, since the sub window is disposed on one area of the main window, the content of the main window overlapping under the sub window may be hidden.

However, since the display 260 of the electronic device 101 has a limited size, the display ratio of sub windows displayed on the main window may be limited. For example, in a state in which the sub-window is configured to occupy more than a certain size of the main window, for example, 25% or more (and less than 100%) of the area of the main window, movement of the sub-window within the main window may be limited. Therefore, due to the limited size of the display 260, the content of the main window overlapping under the sub window may be hidden. In this way, when the sub-window covers more than a certain size of the main window, the need to expose the overlapped area of the main window under the sub-window may increase.

According to an embodiment, in a state in which the sub window is displayed on the main window, the processor 220 may detect a predesignated type of user input. The predesignated type of user input is an input to expose the main window area overlapping under the sub window and may include a touch input (e.g., long touch) of a designated period of time or longer. Further, besides the long touch, the predesignated type of user input may include a predetermined input type, such as a touch and hold, double finger input, touch press (e.g., pressing strength), hovering, and/or designated specific key.

According to an embodiment, the processor 220 may identify whether the predesignated type of user input is an input through one main window area not overlapping the sub window. Further, upon identifying a user input through one main window area, the processor 220 may identify whether the user input is of a predesignated type.

Upon identifying a predetermined type of user input through one main window area, the processor 220 may regard the identified user input as an input for visually exposing the main window area hidden under the sub window. According to an embodiment, the processor 220 may control to transparently display the sub window to expose the hidden main window area in response to the identified user input. According to an embodiment, the sub window may be provided as entirely transparent or translucent. Further, the sub window may be provided to have one area transparent except only for the outline. Further, the sub window may be provided using a shadow to indicate the presence of the sub window on the main window.

According to an embodiment, the processor 220 may identify whether the user input through the one main window area lasts/continues a designated period of time or longer. The processor 220 may keep on transparently displaying the sub window while the user input is maintained. Accordingly, if the user input is released, the processor 220 may stop transparently displaying the sub window. As such, while the user input lasts/continues, the visibility/legibility of the overlapping main window area hidden by the sub window may be provided by adjusting the display of the sub window. Although a method for adjusting the transparency of the sub window has been described as an example method for visually exposing the overlapping main window area hidden by the sub window, embodiments of the disclosure may not be limited thereto. For example, the processor 220 may control the display to temporarily shrink the size of the sub window in response to the user input to expose the overlapping main window area.

According to an embodiment, as the processor 220 transparently displays the sub window or temporarily downsizes and displays the sub window, it is possible to reduce the likelihood of loss of the content in the sub window as compared with a way of closing the sub window for the user to identify the content on the main window. Accordingly, the user may identify the content in the hidden area while the user input lasts/continues even without closing the sub window. Further, at the time when the user input is released, the sub window may return to the original state, so that the user may proceed successive to the previous task.

According to an embodiment, display control of the sub window in the state in which the main window is displayed may be triggered by the touch lasting time (e.g., long touch) detected through the sensing panel, a predetermined type of user input, such as a double finger input, touch press, and/or a designated specific key. Further, the predetermined type of user input may include a touch event (tap, double touch, long touch, or hovering) that occurs with a specific button in the stylus pen pressed.

According to an embodiment, if the predetermined type of user input is detected, the processor 220 may automatically make the sub window transparent or downsize the sub window and then count a preset time. The preset time may be changed by the user. For example, upon identifying a double finger input, the processor 220 may transparently display the sub window and then count a preset time (e.g., three seconds) to stop the transparent display of the sub window. Accordingly, if the preset time elapses, the transparent display of the sub window may be automatically stopped.

According to an embodiment, if the predetermined type of user input is detected, the processor 220 may automatically make the sub window transparent or downsize the sub window and then identify whether the predetermined type of user input is detected again. For example, upon identifying a double tap input, the processor 220 may transparently display the sub window and then, upon identifying another double tap input, terminate the transparent display of the sub window. In this case, as in a toggling type, the first double tap may be one for transparently displaying the sub window, and the second double tap may be used as an input for terminating the transparent display of the sub window. Such toggling type need not keep the user touching the screen with her finger, and thus the user may freely move her hand.

According to an embodiment, the processor 220 may use fade-out and fade-in effects. For example, the processor 220 may make the sub window gradually disappear to visually expose the overlapping main window area hidden by the sub window in response to the predetermined type of user input, then gradually appear back. For example, the transparency of the sub window to make the sub window gradually transparent may be gradually varied from 0% to 100%.

As described above, the processor 220 may control the display of the sub window in various manners to visually expose the overlapping main window area hidden by the sub window, while the user input lasts/continues (e.g., a long touch), or based on one user input (e.g., double finger input).

According to an embodiment, the electronic device (e.g., the electronic device 101 of FIGS. 1 to 3) may include a display (e.g., the display module 160 of FIG. 1 or the display 260 of FIG. 3) and at least one processor (e.g., the processor 160 of FIG. 1 or the processor 220 of FIG. 3). According to an embodiment, the at least one processor may be configured to display a first window of an application through the display. According to an embodiment, the at least one processor may be configured to display a second window on one area of the first window based on a selection of a first item of the first window. According to an embodiment, the at least one processor may be configured to identify a predesignated type of first user input through another area of the first window. According to an embodiment, the at least one processor may be configured to transparently display one area of the second window to expose the one area of the first window in response to the first user input.

According to an embodiment of the disclosure, there may be provided various effects including allowing the user to conveniently identify a main window of an application currently running, hidden by a sub window associated with the application, without moving or closing the sub window in a state in which the sub window is overlaid on the main window.

According to an embodiment, the at least one processor may be configured to identify whether the first user input lasts/continues a designated period of time or longer. According to an embodiment, the at least one processor may be configured to transparently display the one area of the second window while the first user input lasts/continues.

According to an embodiment, the at least one processor may be configured to stop transparently displaying the one area of the second window in response to the first user input being released (e.g., being discontinued). According to an embodiment of the disclosure, there may be provided various effects including allowing the user to easily identify a portion of another window hidden by the sub window displayed at the top temporarily as necessary.

According to an embodiment, the at least one processor may be configured to reduce a size of the second window from a first size to a second size to expose the one area of the first window while the first user input lasts/continues. According to an embodiment, the at least one processor may be configured to stop displaying of the second window in the second size and display the second window in the first size, in response to the first user input being released (e.g., being discontinued).

According to an embodiment, the at least one processor may be configured to display a third window disposed on one area of the second window based on a selection of a first item of the second window. According to an embodiment, the at least one processor may be configured to identify a predesignated type of second user input through another area of the second window. According to an embodiment, the at least one processor may be configured to transparently display one area of the third window to expose the one area of the second window in response to the second user input.

According to an embodiment, the at least one processor may be configured to identify the first user input and the second user input through the other area of the first window or the other area of the second window, respectively, in a state in which the third window disposed on one area of the second window is displayed, based on the selection for the first item of the second window. According to an embodiment, the at least one processor may be configured to transparently display one area of the second window and one area of the third window to expose the one area of the first window in response to the first user input and the second user input.

According to an embodiment, the at least one processor may be configured to identify the first user input through the other area of the first window, in a state in which a third window disposed on one area of the second window is displayed, based on a selection for a first item of the second window. According to an embodiment, the at least one processor may be configured to transparently display one area of the second window and one area of the third window to expose the one area of the first window in response to the first user input.

According to an embodiment, the at least one processor may be configured to stop the transparent display of the one area of the third window if the second user input is released while the first user input, of the first user input and the second user input, lasts/continues.

According to an embodiment, the at least one processor may be configured to stop the transparent display of the one area of the second window and transparently display the one area of the third window if the first user input is released while the second user input, of the first user input and the second user input, lasts/continues.

According to an embodiment of the disclosure, there may be provided various effects including allowing the user to select at least one window to expose a hidden portion of a desired window of the multiple window in a state in which multiple windows are overlaid.

According to an embodiment, the electronic device may transparently process at least one window selected from among multiple windows in response to the user's selection, enhancing the legibility of the temporarily hidden portion under the at least one window. According to an embodiment, the predetermined type of first user input and the predesignated type of second user input may include a touch input that lasts/continues a designated period of time or longer.

According to an embodiment, the electronic device may include a display and at least one processor. According to an embodiment, the at least one processor may be configured to display a first window of an application through the display. According to an embodiment, the at least one processor may be configured to, based on a first input, display a second window on a first partial area of the first window to hide the first partial area of the first window. According to an embodiment, the at least one processor may be configured to, based on a second input through the first window, display the hidden first partial area of the first window. According to an embodiment, the at least one processor may be configured to, in response to the second input being released, display the second window to hide the first partial area of the first window.

According to an embodiment, the at least one processor may be configured to identify whether the second input continues for a designated period of time or longer and control a transparency of the second window such that the first partial area of the first window is visually exposed while the second input is continuing.

According to an embodiment, the at least one processor may be configured to, in response to the second input being released, stop controlling the transparency of the second window.

According to an embodiment, the at least one processor may be configured to reduce a size of the second window from a first size to a second size to display the first partial area of the first window while the second input is continuing and in response to the second input being released, stop displaying the second window in the second size and display the second window in the first size.

According to an embodiment, the at least one processor may be configured to, based on a third input, display a third window on a second partial area of the second window to hide the second partial area of the second window, based on a fourth input through the second window, display the hidden second partial area of the second window and in response to the fourth input being released, display the third window to hide the second partial area of the second window.

According to an embodiment, the at least one processor may be configured to, based on simultaneous inputs on the first and second windows, control a transparency of the second and third windows such that the first partial area of the first window is visually exposed.

According to an embodiment, the at least one processor may be configured to control the transparency of the second and third windows such that the first partial area of the first window is visually exposed while the simultaneous inputs are continuing and in response to the simultaneous inputs being released, stop controlling the transparency of the second and third windows.

According to an embodiment, the at least one processor may be configured to, based on the first input to select a first item of the first window, display the second window for inputting content for the first window, obtain content through the second window and display the obtained content in the first window.

According to an embodiment, the second window is associated with at least one task among a plurality of tasks of the application.

According to an embodiment, the second input includes at least one of a long touch, double finger input, touch press, hovering, or designated specific key.

Figure 4A:
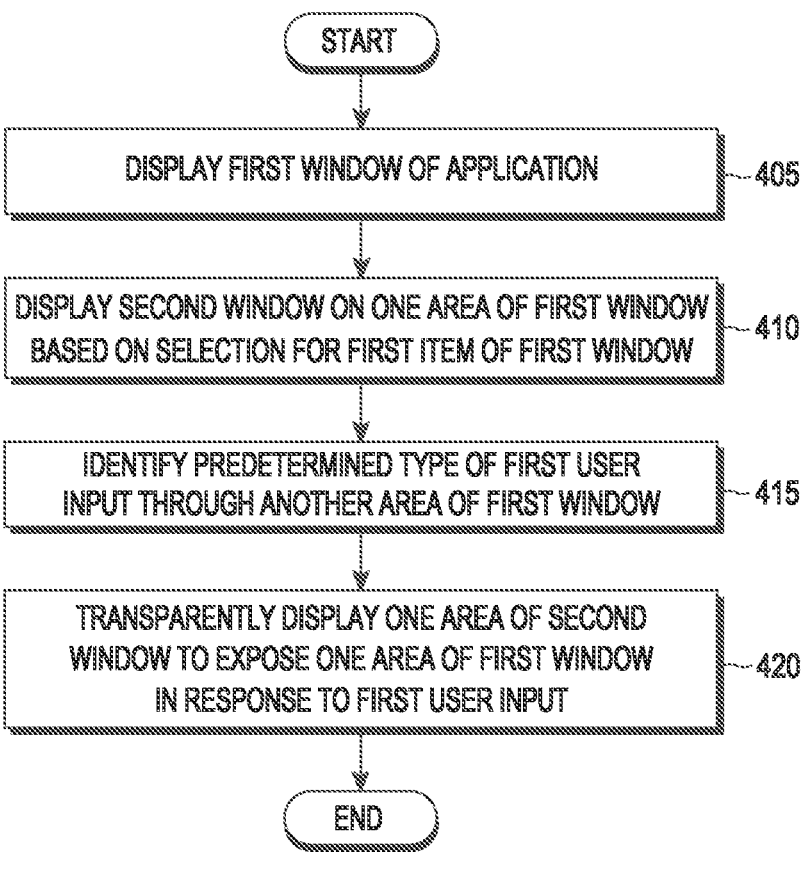
FIG. 4A is a flowchart illustrating operations of an electronic device to control display of a multiple window according to an embodiment.
Figure 5:
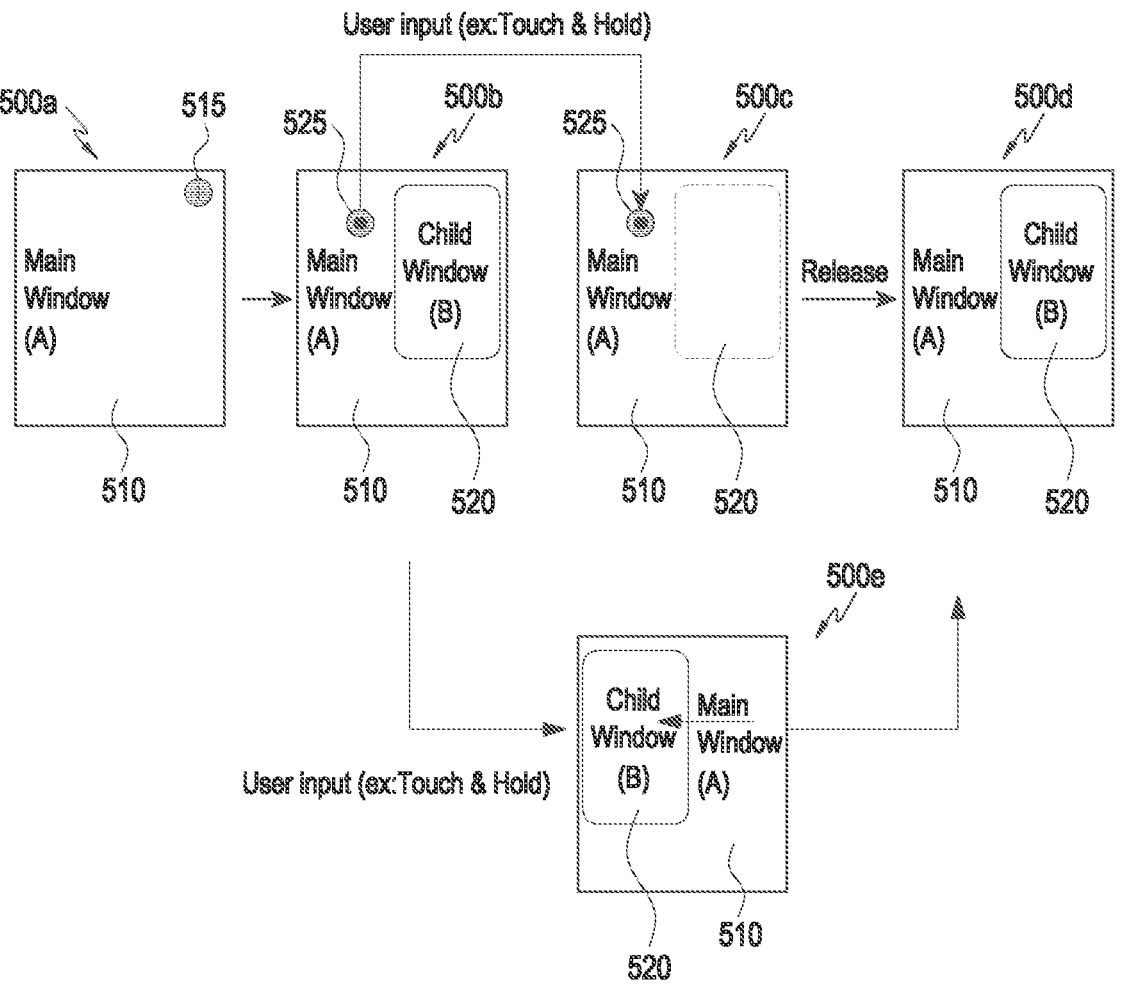
FIG. 5 is an example view illustrating a method for exposing a portion of a main window hidden by a sub window according to an embodiment.

FIG. 4A is a flowchart illustrating operations of an electronic device to control display of a multiple window according to an embodiment. FIG. 4A may be described with reference to FIG. 5 for a better understanding. FIG. 5 is an example view illustrating a method for exposing a portion of a main window hidden by a sub window according to an embodiment.

Referring to FIG. 4A, the operation method may include operations 405 to 420. Each operation of the operation method of FIG. 4A may be performed by an electronic device (e.g., the electronic device 101 of FIG. 1, the electronic device 101 of FIG. 2, or the electronic device 101 of FIG. 3) or at least one processor (e.g., at least one of the processor 120 of FIG. 1 or the processor 220 of FIG. 3) of the electronic device. In an embodiment, at least one of operations 405 to 420 may be omitted or changed in order or may add other operations.

In operation 405, the electronic device 101 may display a first window of an application through the display (e.g., the display module 160 of FIG. 1 or the display 260 of FIG. 3) of the electronic device. For example, the electronic device 101 may create the first window for the application in response to an application execution request by the user and configure the application execution screen in the first window. The first window may include at least one item indicating a providable function and content of the application.

In operation 410, the electronic device 101 may display a second window on a first partial area (which may be referred to as "a first part" or "a first portion") of the first window based on a selection of the first item of the first window. The second window may be a window created based on the user selection of the item displayed on the first window. The second window created by an input to the first window may be child window, and the first window may be a parent window.

For example, referring to FIG. 5, in response to selection of an item 515 on the main window 510 as shown in view 500a, the child window 520 may be overlaid on one area of the main window 510 as shown in view 500b. There may be divided into an overlapping area B and a non-overlapping area, which is the rest of area A except for area B, between the main window 510 and the child window 520. View 500b of FIG. 5 shows an example in which the overlapping area B is a portion of the main window 510, but the overlapping area B may cover most of the main window 510. As such, when an overlap occurs in some area, there may be an overlapping area B and a non-overlapping area (e.g., the remaining area of area A except for area B). FIG. 5 illustrates an example in which one child window 520 overlaps the main window 510. However, if a sub child window (not shown) corresponding to the child window 520 is created and displayed, the sub child window may have the same or different size from the size of the child window 520. For example, the sub child window may be smaller in size than the child window 520 but may correspond to the entire child window 520.

In operation 415, the electronic device 101 may identify a predetermined type of first input through a second partial area (which may be referred to as "a second part", "a second portion" or "a remaining area except for the first partial area") of the first window. For example, referring to FIG. 5, as shown in view 500b, the electronic device 101 may detect whether there is a user input 525 for controlling the visibility of the main window 510 corresponding to the portion hidden by the child window 520. For example, upon detecting a predetermined type of user input on the non-overlapping area of the main window 510, the electronic device 101 may identify that the user input is an input for adjusting the transparency of the child window 520. FIG. 5 exemplifies a touch and hold as an example of the predetermined type of user input, but the user input may include various types of touches, such as a long touch (e.g., equal to or greater than a designated period of time), or a hovering, and examples of the user input may not be limited thereto.

In operation 420, the electronic device 101 may control transparency of the second window so that the first partial area of the first window is visually exposed (which may be referred to as "displayed" or "viewable"), in response to the first input. According to an embodiment, the operation of transparently displaying one area of the second window may include the operation of identifying whether the first user input lasts/continues a designated period of time or longer, and the operation of transparently displaying the one area of the second window occurs while the first user input lasts/continues. For example, the electronic device 101 may control the display to keep on transparently displaying one area of the second window while the first user input lasts/continues. Accordingly, the operation of transparently displaying the second window may be maintained or stopped depending on whether the first user input lasts/continues.

Referring to FIG. 5, as shown in view 500c, the electronic device 101 may adjust the transparency of, and display, the child window 520 based on a user input 525 for controlling the visibility of the main window 510 corresponding to the portion hidden by the child window 520.

According to an embodiment, as in 500e of FIG. 5, based on the user input 525, the electronic device 101 may move and arrange the child window 520 so that a portion of the main window 510 covered by the child window 520 is visually exposed.

In an embodiment, the electronic device 101 may adjust the transparency value of the second window. Here, the transparency value may be determined in a range from 0 to 100. When the transparency value for being fully transparent is 100, the transparency value for being fully opaque may be 0. For example, the electronic device 101 may set the transparency value of the entire second window or one area of the second window except for the outline to 100, but may also set the transparency value of the portion corresponding to the overlapping area to a semi-transparent value (e.g., transparency value=50). As such, the transparency value of the second window may be determined in a range in which the visibility of the one area of the first window is not significantly reduced. As such, when only a portion of the second window is adjusted for transparency, the user may recognize the presence of the second window on the first window.

According to an embodiment, the method may further include the operation of stopping transparently displaying the one area of the second window if the first user input is released. For example, the electronic device 101 may identify whether the first user input is released while one area of the second window is displayed transparently. The electronic device 101 may display the second window back (e.g., normally without transparency) based on release of the first user input.

Referring to FIG. 5, as shown in view 500d, the electronic device 101 may return the child window 520 to the previous state in response to a user input (e.g., touch and hold). In other words, upon detecting no more first user input, the electronic device 101 may stop adjusting the transparency of the second window and then display a second window with the original attributes. For example, it is possible to display the second window opaque (e.g., transparency value=0) by displaying the second window back based on the previous transparency value.

As described above, it is possible to prevent degradation of visibility due to an overlap between the second window and the first window by adjusting the transparency of the second window in response to a predesignated user input. In other words, the visibility of the first window may be controlled by adjusting the transparency of the second window.

According to an embodiment, the method may further include the operation of reducing a size of the second window from a first size to a second size to expose the one area of the first window while the first user input lasts. According to an embodiment, the method may further include the operation of stopping displaying of the second window in the second size and displaying the second window in the first size, in response to the first user input being released. As such, the electronic device 101 may control the display to expose the overlapping area of the main window by temporarily shrinking the second window in addition to adjusting the transparency of the second window.

According to an embodiment, the method may further include the operation of displaying a third window disposed on one area of the second window based on a selection of a first item of the second window. Specifically, the electronic device 101 may create a plurality of sub windows. The created sub windows may at least partially overlap each other. For example, the electronic device 101 may create a second sub window and overlay the second sub window on a first sub window (e.g., a second sub window can be overlaid on a first sub window) in response to selection of an item displayed on the first sub window. In this case, the main window may have an overlapping area by the first sub window and the second sub window (e.g., the first sub window overlaps the main window, while the second sub window overlaps the first sub window).

According to an embodiment, the method may further include the operation of identifying a predesignated type of second user input through another area of the second window. According to an embodiment, the method may further include the operation of transparently displaying one area of the third window to expose the one area of the second window in response to the second user input. For example, when the user views the overlapping area of the sub window hidden by the sub sub window, the electronic device 101 may detect a user input through another area of the sub window except for one area where the sub sub window is disposed. Upon detecting a predetermined type of user input through the other area of the sub window, the predetermined type of user input may be regarded as an input for controlling the visibility of the sub window. Accordingly, the electronic device 101 may transparently display the sub sub window to expose the one area of the sub window hidden by the sub sub window (e.g., the one area of the first sub window is exposed through the transparently second sub window).

According to an embodiment, the method may further include the operation of identifying the first user input and the second user input through the other area of the first window or the other area of the second window, respectively, in a state in which a third window disposed on one area of the second window is displayed, based on selection of a first item of the second window. According to an embodiment, the method may further include the operation of transparently displaying one area of the second window and one area of the third window to expose the one area of the first window in response to the first user input and the second user input. According to an embodiment, the predetermined type of first user input and the predesignated type of second user input may include a touch input that lasts/continues a designated period of time or longer.

When the user views the overlapping area of the main window hidden by both the sub window and the sub sub window, the electronic device 101 may detect a user input through each of another area of the main window, which is the remaining area except for the overlapping area with the sub window, and another area of the sub window, which is the remaining area except for the overlapping area with the sub sub window. For example, when the user keeps the touch with two fingers on the respective areas, the electronic device 101 may adjust the transparency of each of the uppermost sub sub window and the sub window that has invoked the sub sub window. Accordingly, the overlapping area of the main window hidden by the sub sub window and the sub window may appear, providing legibility (e.g., visibility) of the main window.

According to an embodiment, the method may further include the operation of stopping the transparent display of one area of the third window if the second user input is released while the first user input, of the first user input and the second user input, lasts/continues. For example, when the user releases the touch with two fingers on the respective areas, the electronic device 101 may stop adjusting the transparency of each of the uppermost sub sub window and the sub window. Accordingly, the electronic device 101 may process both the sub window and the sub sub window to become opaque, allowing the main window not to be shown any longer.

According to an embodiment, the method may further include the operation of stopping the transparent display of the one area of the second window and transparently displaying one area of the third window if the first user input is released while the second user input, of the first user input and the second user input, lasts/continues. For example, the user may release only the touch with one finger while the touches with the two fingers are maintained on the respective areas, i.e., one area of the main window and one area of the sub window. When the touch on the main window is released, and when the touch on the sub window is maintained, the electronic device 101 may stop the transparent display of the sub window and keep on transparently displaying the uppermost sub sub window. As such, when a plurality of windows overlap each other, it is possible to selectively display all the windows or some upper windows transparently depending on the window selected by the user.

Figure 4B:
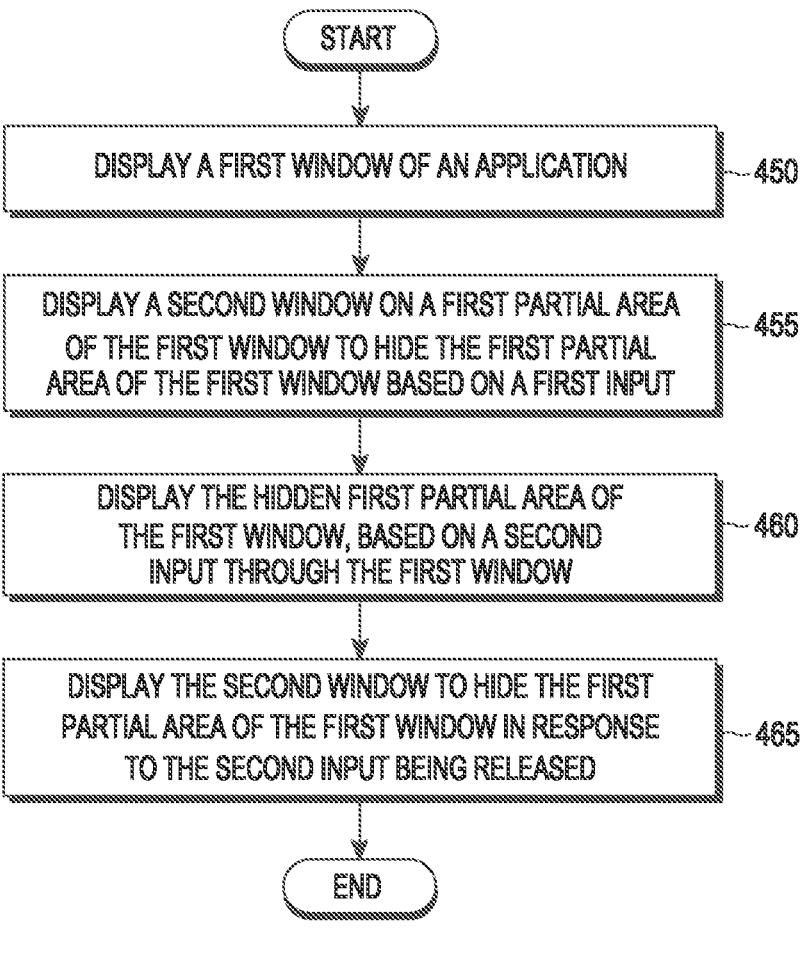
FIG. 4B is a flowchart illustrating operations of an electronic device to control display of a multiple window according to an embodiment.

FIG. 4B is a flowchart illustrating operations of an electronic device to control display of a multiple window according to an embodiment.

In operation 450, the electronic device 101 may display a first window of an application through the display (e.g., the display module 160 of FIG. 1 or the display 260 of FIG. 3) of the electronic device.

In operation 455, the electronic device 101 may display a second window on a first partial area of the first window to hide the first partial area of the first window based on a first input.

In operation 460, the electronic device 101 may display the hidden first partial area of the first window, based on a second input through the first window.

In operation 465, the electronic device 101 may display the second window to hide the first partial area of the first window in response to the second input being released.

According to an embodiment, the displaying the hidden first partial area of the first window includes identifying whether the second input continues for a designated period of time or longer and controlling a transparency of the second window such that the first partial area of the first window is visually exposed while the second input is continuing.

According to an embodiment, the method may further include stopping controlling the transparency of the second window in response to the second input being released.

According to an embodiment, the method may further include reducing a size of the second window from a first size to a second size to display the first partial area of the first window while the second input is continuing and stopping displaying the second window in the second size and displaying the second window in the first size in response to the second input being released.

According to an embodiment, the method may further include, based on a third input, displaying a third window on a second partial area of the second window to hide the second partial area of the second window, based on a fourth input through the second window, displaying the hidden second partial area of the second window and in response to the fourth input being released, displaying the third window to hide the second partial area of the second window.

According to an embodiment, the method may further include, based on simultaneous inputs on the first and second windows, controlling a transparency of the second and third windows such that the first partial area of the first window is visually exposed.

According to an embodiment, the method may further include controlling the transparency of the second and third windows such that the first partial area of the first window is visually exposed while the simultaneous inputs are continuing and stopping controlling the transparency of the second and third windows in response to the simultaneous inputs being released.

According to an embodiment, the method may further include displaying the second window for inputting content for the first window based on the first input to select a first item of the first window, obtaining content through the second window and displaying the obtained content in the first window.

According to an embodiment, the second window is associated with at least one task among a plurality of tasks of the application.

Figure 6:
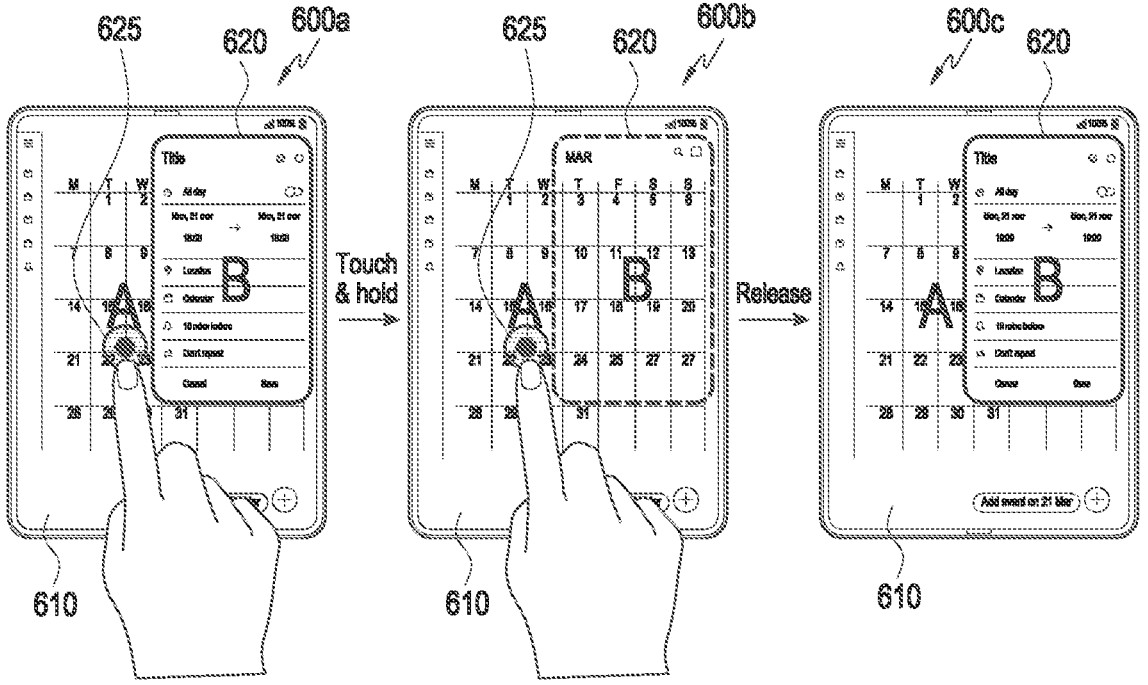
FIG. 6 is a screen example view illustrating a method for controlling display of a sub window based on a predesignated type of user input according to an embodiment.

FIG. 6 is a screen example view illustrating a method for controlling display of a sub window based on a predesignated type of user input according to an embodiment.

Referring to FIG. 6, view 600a shows an example in which an execution screen of an application is displayed on a main window 610, and a sub window 620 created according to selection of an item provided on the main window 610 is overlaid on the main window 610. For example, if an item for executing a first function is selected on the application execution screen on the main window 610, the electronic device 101 may invoke the first function and display a first function execution screen according to execution of the first function, using the sub window 620.

As shown in view 600a in FIG. 6, the electronic device 101 may detect a predetermined type of user input 625 in a state in which the sub window 620 is displayed on the main window 610. The predetermined type of user input 625 is an input for exposing the overlapping area of the main window 610 under the sub window 620, and view 600a exemplifies a touch and hold as an example of the user input 625. Besides the touch and hold, the predesignated type of user input may include various input types, such as a long touch, double finger input, touch press (e.g., pressing strength), hovering, and/or designated specific key.

According to an embodiment, upon detecting a user input, the electronic device 101 may identify whether the detected user input is a predetermined type of user input. When the detected user input is the predetermined type of user input, the electronic device 101 may control the display to transparently display the sub window 620 to expose one area of the main window 610 hidden by the sub window 620 as shown in view 600b in FIG. 6.

According to an embodiment, when the detected user input is the predetermined type of user input, the electronic device 101 may identify the window, where the predetermined type of user input is detected, of the main window and the sub window. For example, upon identifying as the predetermined type of user input through one area of the main window 610, the electronic device 101 may regard the identified user input as an input for visually exposing one area of the main window 610 hidden under the sub window 620.

According to an embodiment, the electronic device 101 may control the display to transparently display the sub window 620 to expose the hidden main window (610) area in response to the identified user input. As shown in view 600b, one area of the sub window 620 may be provided transparently except for the outline. Any display scheme is applicable as long as it allows the user to recognize the presence of the sub window 620. For example, if the sub window 620 turns transparent, the user may visually recognize the hidden portion of the main window 610 positioned under the sub window 620.

The user may desire to resume the task on the previous sub window while viewing the hidden portion of the main window. In this case, as the user releases the user input, the electronic device 101 may stop the operation of adjusting the transparency of the sub window 620. As such, if the user maintains and then releases the user input as shown in view 600c of FIG. 6, the electronic device 101 may quickly return to the original attributes (e.g., original transparency value) and display the sub window 620. For example, it is possible to display the sub window 620 opaque (e.g., transparency value=0) by displaying the second window back/normally based on the previous transparency value.

Accordingly, the user may identify the hidden portion of the main window even without closing or moving the sub window. Further, the user may resume the task which used to be performed on the sub window without losing the content, thereby increasing user convenience.

Figure 7A:
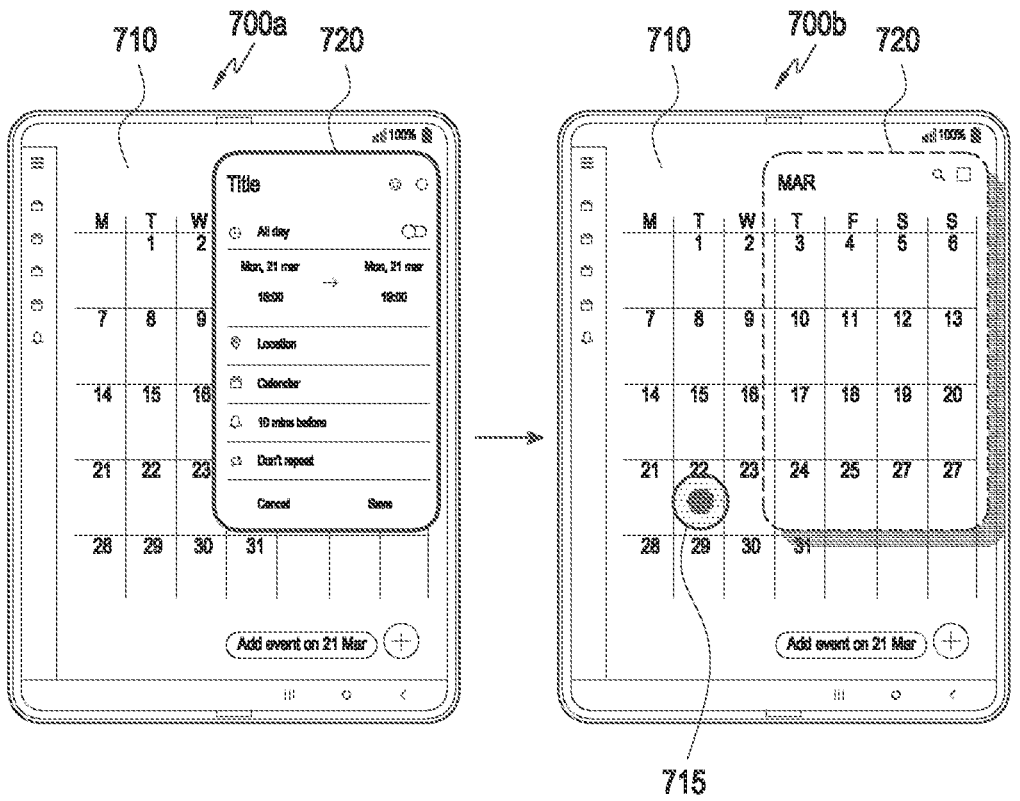
FIG. 7A is an example view illustrating a screen related to display control of a sub window on a calendar application according to an embodiment.

FIG. 7A is an example view illustrating a screen related to display control of a sub window on a calendar application according to an embodiment.

Referring to FIG. 7A, the calendar application may display a schedule in an area of a specific date based on the user's schedule information input on the specific date or notify the user of the schedule at an alarm time. When the user selects a specific date to enable entry schedule information for the specific date, the electronic device 101 may display a sub window 720 for entering a schedule on one area of the main window 710 of the calendar application as shown in view 700a of FIG. 7A. Here, since the sub window 720 is displayed in a manner to float on the main window 710, some schedules on the calendar may be hidden. The user may edit, e.g., add or delete, schedule information through the sub window 720 and may sometimes be required to identify schedule information in the area hidden by the sub window 720. In such a case, as shown in view 700b of FIG. 7A, the user may perform predesignated manipulation to show one area of the main window 710 hidden by the sub window 720 without moving or closing the sub window 720. For example, as shown in view 700b, the transparency of the sub window 720 may be adjusted through manipulation 715 on another area of the main window 710, not the area where the sub window 720 is disposed. Further, the user may make a selection as to whether to maintain the user input and may thus identify the schedule information in the area hidden by the sub window 720 as much as necessary and in a convenient manner.

Figure 7B:
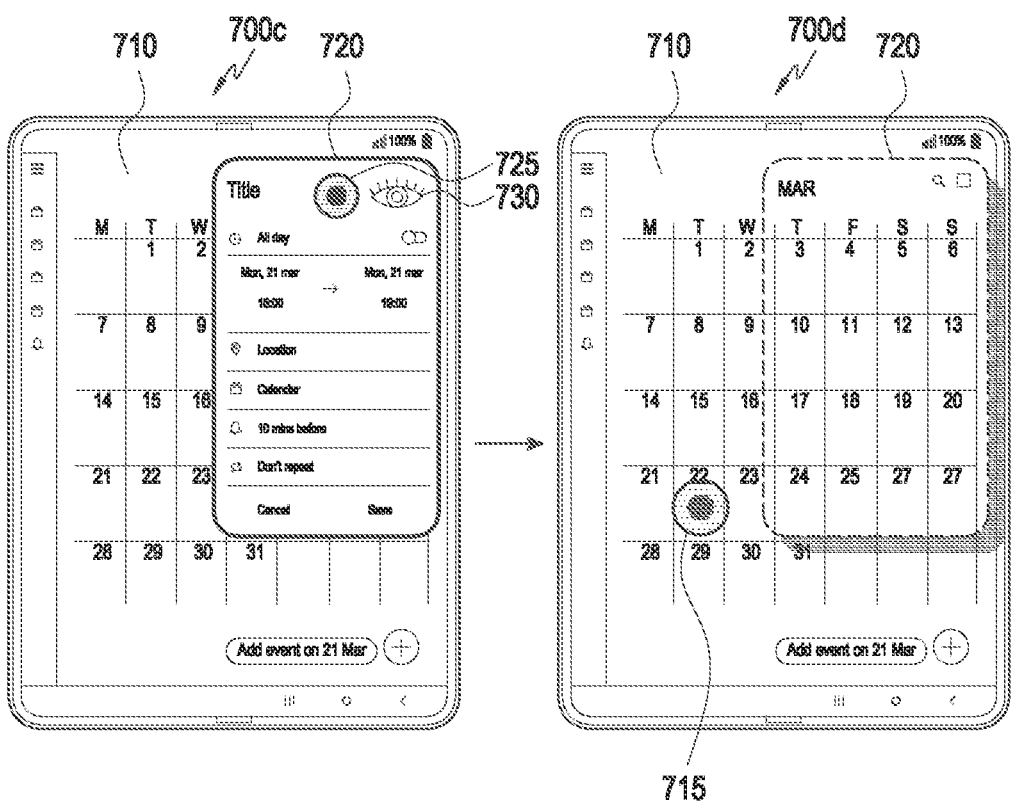
FIG. 7B is an example view illustrating a screen related to display control of a sub window on a calendar application according to an embodiment.

FIG. 7B is an example view illustrating a screen related to display control of a sub window on a calendar application according to an embodiment.

As shown in view 700c of FIG. 7B the electronic device 101 may display a sub window 720 for entering a schedule on a first partial area of the main window 710 of the calendar application. The sub window 720 may include an object for visually exposing the first partial area of the main window 710 hidden by the sub window 720. For example, as shown in 700d, transparency of the sub window 720 may be adjusted in response to selection of an object (e.g., icon) 730 of the sub window 720. In addition, the transparency of the sub window 720 may be adjusted in response to an input 725 of a predetermined type for an empty area on the sub window 720, as shown in 700d.

Figure 7C:
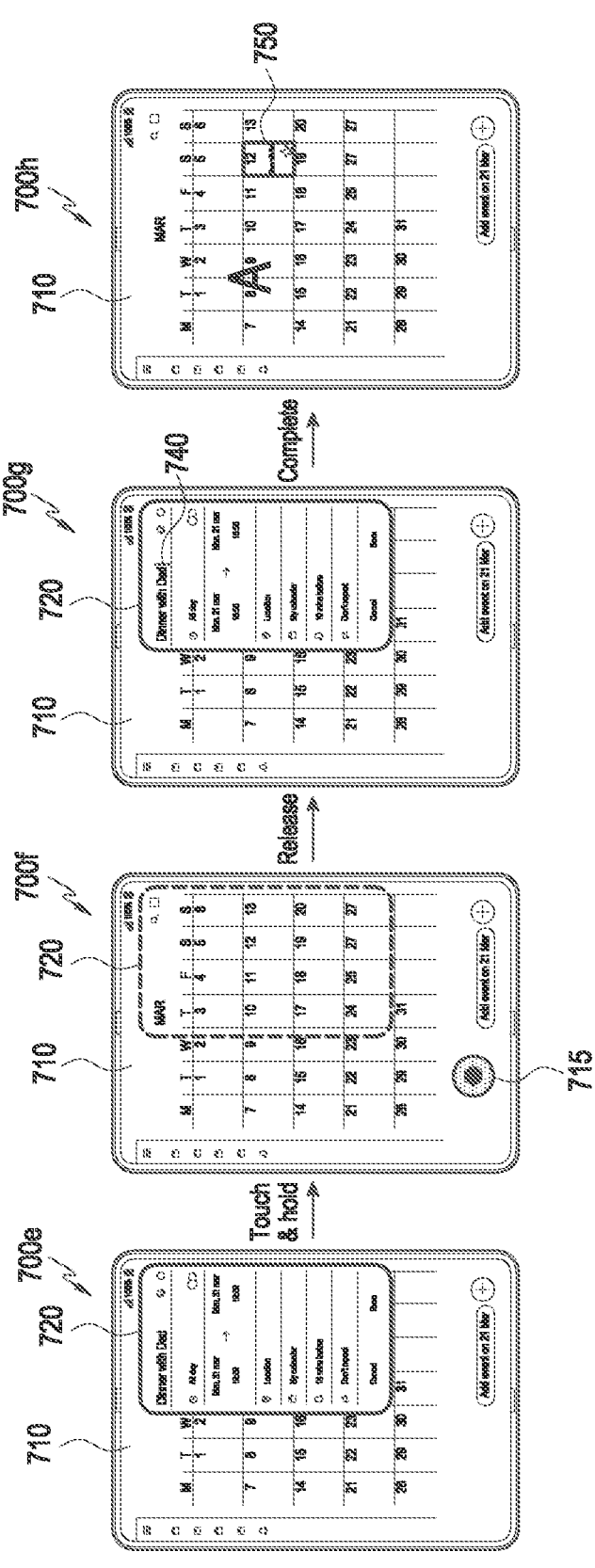
FIG. 7C is an example view illustrating a screen related to input of schedule content through a sub window on a calendar application according to an embodiment.

FIG. 7C is an example view illustrating a screen related to input of schedule content through a sub window on a calendar application according to an embodiment.

Referring to FIG. 7C, in response to an input for selecting an item of the main window 710, a sub-window 720 for inputting content for the main window 710 may be displayed.

As shown in 700e of FIG. 7C, in a state where the sub-window 720 is displayed on a first partial area of the main window 710 of the calendar application, as shown in 700f, based on the input 715 through another area of the main window 710, transparency of the sub window 720 may be adjusted. The input 715 may be an input through an area other than an area in the main window 710 where selectable items are arranged. The electronic device 101 may obtain content through the sub window 720 and display the content in the main window 710.

As shown in 700g of FIG. 7C, when the user inputs 740 the schedule contents (e.g., 'Dinner with Dad') on a specific date and completes the schedule input, the schedule contents (e.g., 'Dinner with Dad') 750 are displayed in the area of the specific date as shown in 700h.

Figure 8:
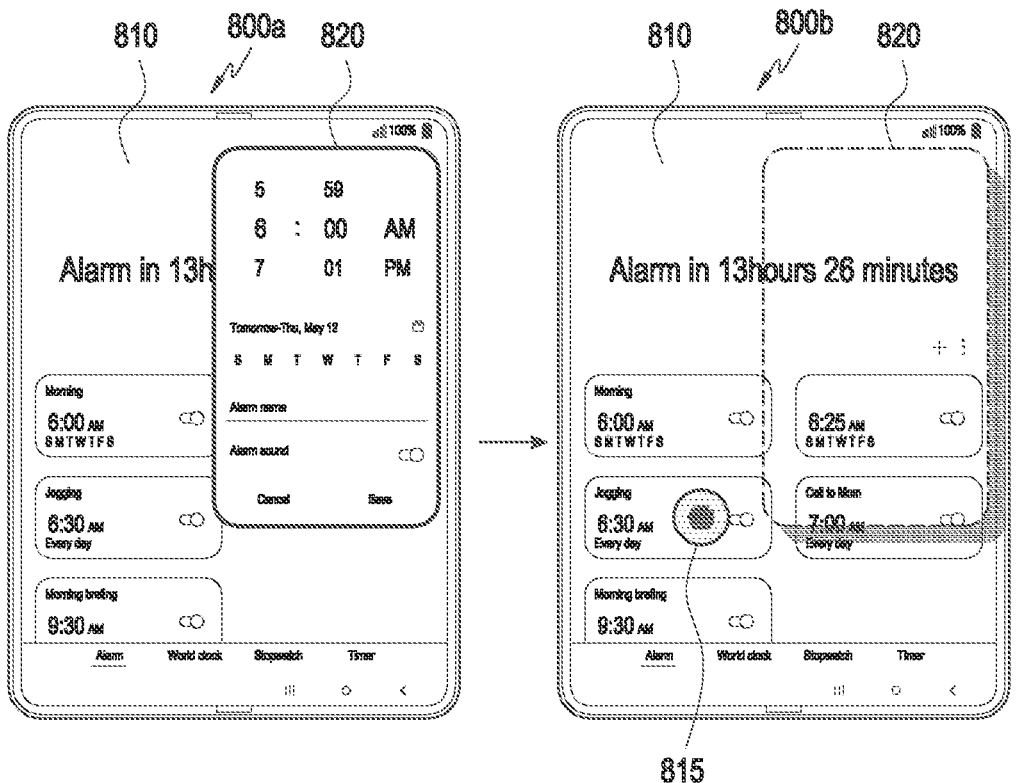
FIG. 8 is an example view illustrating a screen related to display control of a sub window on a clock application according to an embodiment.

FIG. 8 is an example view illustrating a screen related to display control of a sub window on a clock application according to an embodiment.

Referring to FIG. 8, a clock application may provide a notification function for managing the user's schedule. The notification function may mean a function that generates a specific audio and/or vibration at the time designated by the user to notify the user that the time arrives. As shown in view 800a of FIG. 8, the user may previously recognize a specific schedule and directly set the alarming time for the schedule through the sub window 820. When the user identifies one area on the main window 810 hidden by the sub window 820, it is possible to identify the visibility of the main window 810 with a simple user input 815 through another area of the main window 810, i.e., the area except for the overlapping area with the sub window 820, as shown in view 800b of FIG. 8.

Figure 9:
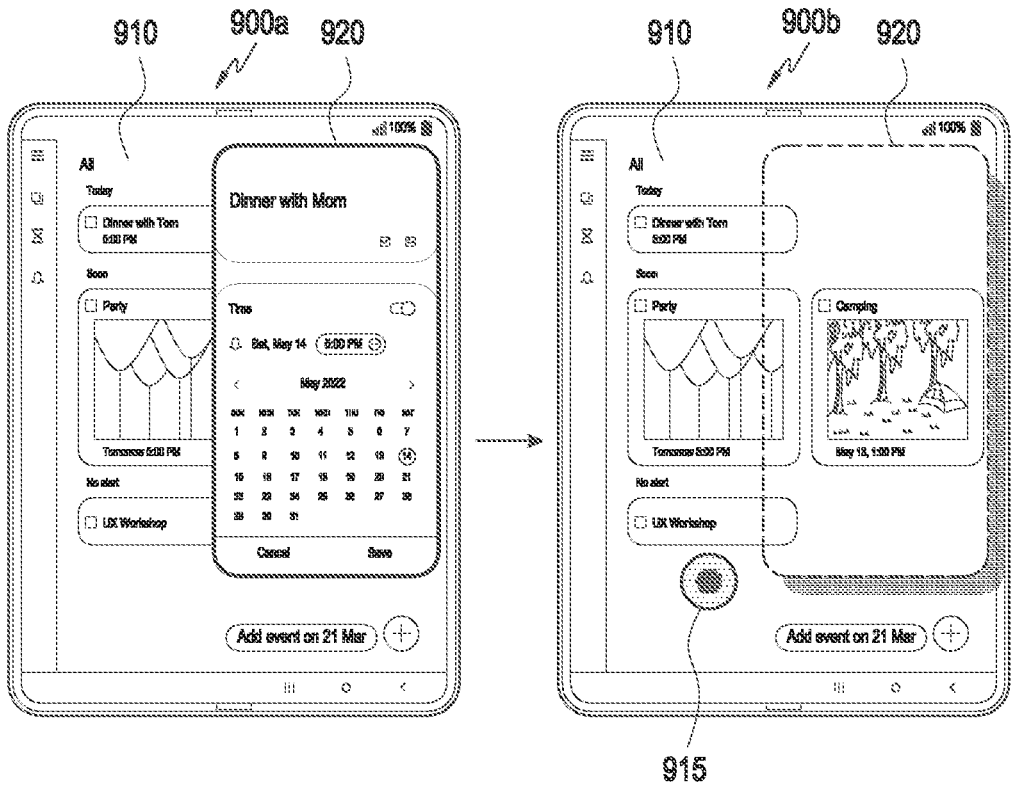
FIG. 9 is an example view illustrating a screen related to display control of a sub window on a reminder application according to an embodiment.

FIG. 9 is an example view illustrating a screen related to display control of a sub window on a reminder application according to an embodiment.

Referring to FIG. 9, the reminder application may provide the function of reminding the user about to-do's, schedules, and things supposed to be remembered according to the context, such as time or place. As shown in view 900a of FIG. 9, the user may set notification conditions/repeat conditions at a set time, such as date, day/time, through the sub window 920 and, for a place notification reminder, set a notification to be provided only in a specific time range.

When the user is to identify one area on the main window 910 hidden by the sub window 920, the visibility of the main window 910 may be identified through a user input to another area of the main window 910 which does not overlap the sub window 920. The electronic device 101 may change the transparency of the sub window 920 according to a user input to the other area of the main window 910. For example, according to a predesignated user input 915, the electronic device 101 may change the transparency value to make the sub window 920 transparent as shown in view 900b of FIG. 9. Accordingly, the sub window 920 may be displayed with the changed transparency value and, while the user input lasts, the sub window 920 may be displayed transparently. In this case, the electronic device 101 may add a shadow and highlight effect to the border of the sub window 920 to clearly differentiate between the main window 910 and the sub window 920. The emphasizing effect allows the user to recognize the presence of the sub window 920.

Figure 10:
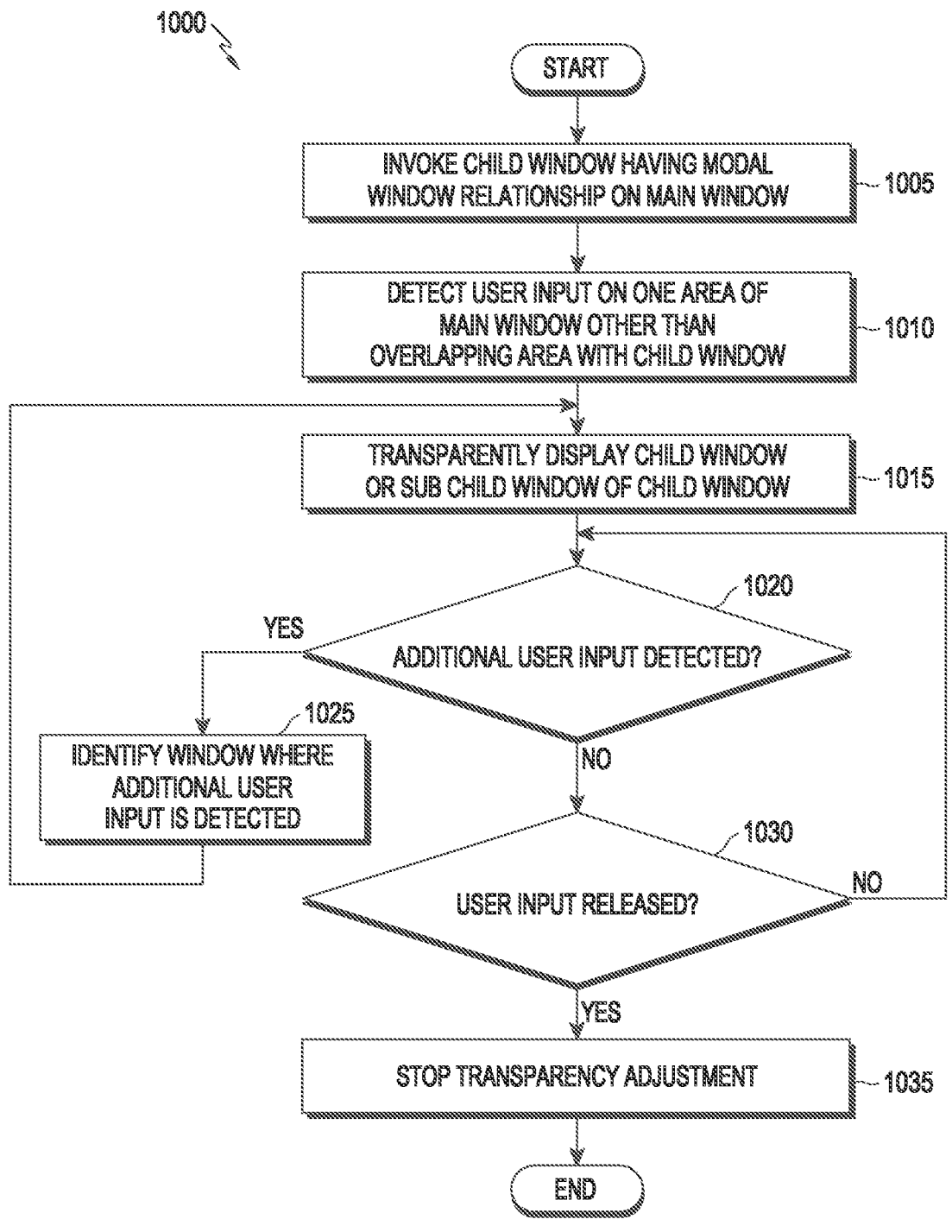
FIG. 10 is a flowchart illustrating detailed operations of an electronic device to control display of a multiple window according to an embodiment.

FIG. 10 is a flowchart 1000 illustrating detailed operations of an electronic device to control display of a multiple window according to an embodiment. In an embodiment, at least one of operations 1005 to 1035 may be omitted or changed in order or may add other operations and at least two operations may be performed in parallel.

In operation 1005, the electronic device 101 may invoke a child window, which has a modal window relationship with the main window, on the main window. Here, the child window is invoked as an item on the main window is selected, and the modal window may mean the (functional) relationship between the main window and the child window.

In operation 1010, the electronic device 101 may detect a user input in one area of the main window except for the overlapping area with the child window. The user input may correspond to a predesignated type for requesting the visibility of the main window. In response to the user input, the electronic device 101 may transparently display the child window or a sub child window of the child window in operation 1015. For example, in a state in which one child window is displayed on the main window, the electronic device 101 may transparently display the child window. In a state in which two or more child windows are displayed on the main window, the electronic device 101 may transparently display all of the sub child windows, which are invoked from, and dependent upon the child window, as well as the child window. Accordingly, the transparency value of the overlapping area on the main window by the child window or its sub child window may be set to a fully transparent or semi-transparent value, enhancing the visibility of the overlapping area of the main window.

In operation 1020, the electronic device 101 may identify whether an additional user input is detected. In operation 1025, the electronic device 101 may identify the window where the additional user input is detected. For example, in a state in which two or more child windows are displayed on the main window, the electronic device 101 may identify whether an additional user input is detected. When the user input is detected, the electronic device 101 may identify whether the detected additional user input is detected through one area of the sub window on the main window, rather than the main window. Upon identifying the window where the additional user input is detected, the electronic device 101 may proceed to operation 1015. For example, when the window where the additional user input is detected corresponds to the sub window on the main window, the electronic device 101 may transparently display the sub sub window disposed on the sub window.

In contrast, when an additional user input is not detected in operation 1020, the electronic device 101 may identify whether the user input is released in operation 1030. In operation 1035, the electronic device 101 may stop transparency adjustment in response to the release of the user input.

For example, if the user input is released in a state in which one child window is displayed on the main window, the electronic device 101 may stop the transparent display of the child window. In contrast, if the user input is released in a state in which two or more child windows all are transparently displayed on the main window, the electronic device 101 may stop the transparent display of all of the sub child windows, which are invoked from, and dependent upon the child window, as well as the child window.

Figures 11, 12:
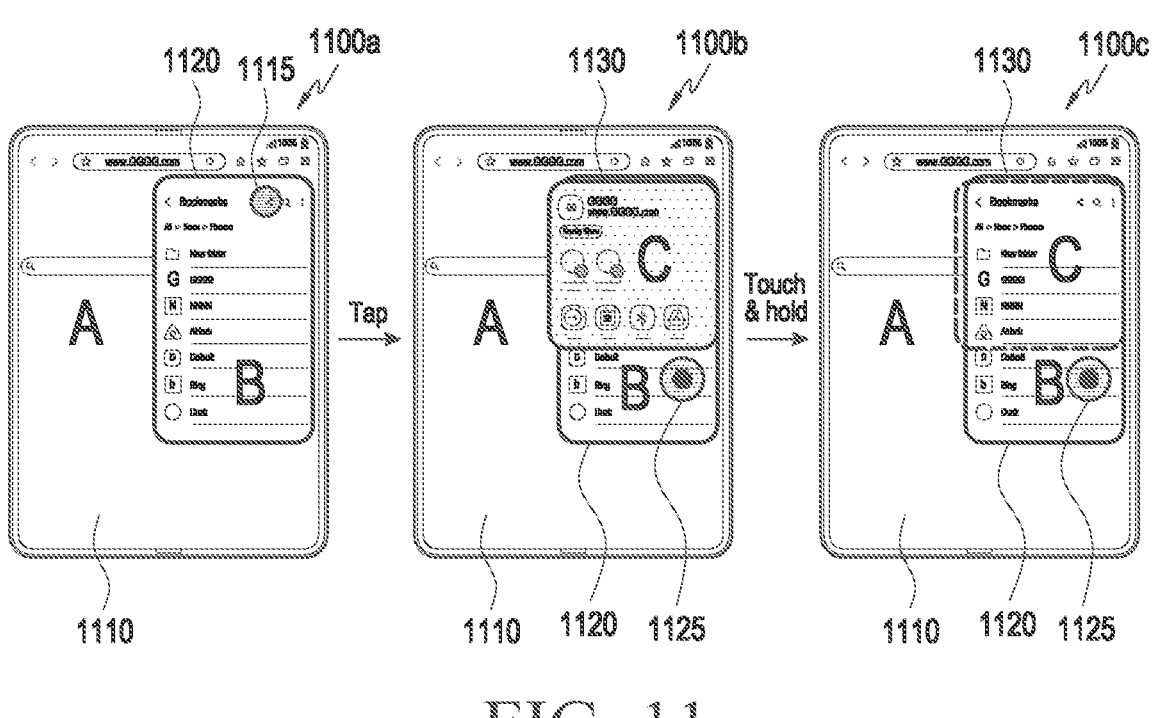
FIG. 11 is a screen example view illustrating a method for controlling display of an uppermost sub window according to an embodiment.
FIG. 12 is a screen example view illustrating a method for controlling display of all sub windows according to an embodiment.

FIG. 11 is a screen example view illustrating a method for controlling display of an uppermost sub window according to an embodiment.

Referring to FIG. 11, as shown in view 1100*a*, one child window 1120 may be displayed on a main window 1110 of the electronic device 101 but, as shown in view 1100*b*, two or more child windows 1120 and 1130 may be overlaid on the main window 1110. For example, an item 1115 on the child window 1120 may be selected in a state in which the child window 1120 is invoked on the main window 1110. In this case, as shown in view 1100*b*, the electronic device 101 may display a sub child window 1130 on the child window 1120. As such, the lastly invoked window may be set with the AOT function to be always floating on the other windows.

Upon detecting a predetermined type of user input 1125 on the child window 1120 as shown in view 1100*b*, the electronic device 101 may adjust the transparency of the sub child window 1130 disposed on the child window 1120 selected as shown in view 1100*c* of FIG. 11. Accordingly, as shown in view 1100*c*, the electronic device 101 may transparently display the uppermost sub child window 1130. As such, the user may select the window that she wants to look transparent temporarily using a predetermined type of user input.

FIG. 12 is a screen example view illustrating a method for controlling display of all sub windows according to an embodiment. As shown in view 1200*a* of FIG. 12, an item 1215 on the child window 1220 may be selected in a state in which the electronic device 101 invokes the child window 1220 on the main window 1210. In this case, as shown in view 1200*b* of FIG. 12, two or more child windows 1220 and 1230 may be overlaid on the main window 1210.

If a predesignated user input 1225 is detected through an area of the main window 1210 not overlapping the child windows 1220 and 1230, the user input 1225 may be regarded as a request for the visibility of the main window 1210. Accordingly, the electronic device 101 may transparently display all of the child windows 1220 and 1230 as shown in view 1200*c* of FIG. 12. According to an embodiment, in view 1200*c*, one area of the sub child window 1230 may be transparently provided except only for the outline of the sub child window 1230 to allow it to be possible to recognize only the presence of the sub child window 1230. According to an embodiment, view 1200*c* illustrates an example in which only the border of the sub child window 1230 which is disposed at the top is displayed, but this is merely an example, and embodiments of the disclosure may not be limited thereto. For example, an effect, e.g., shadow, may be added to the border of the child window 1220 along with the sub child window 1230 to allow the user to recognize the presence of the child windows 1220 and 1230.

Figure 13:
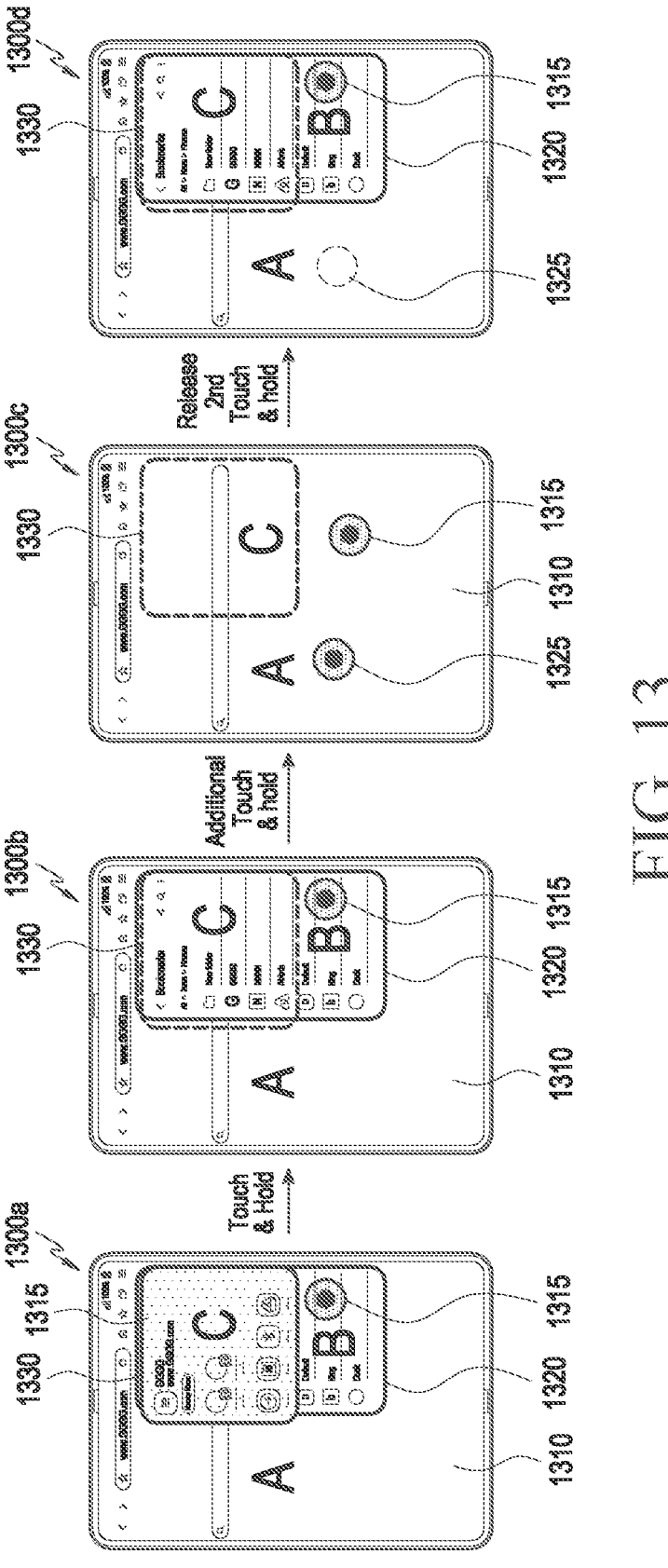
FIG. 13 is a screen example view illustrating a method for sequentially controlling display of sub windows according to a user input according to an embodiment.

FIG. 13 is a screen example view illustrating a method for sequentially controlling display of sub windows according to a user input according to an embodiment.

Referring to FIG. 13, as shown in view 1300*a*, two or more child windows 1320 and 1330 may be overlaid on the main window 1310. Upon detecting a predetermined type of user input 1315 on the child window 1320 as shown in view 1300*a*, the electronic device 101 may adjust the transparency of the sub child window 1330 disposed on the child window 1320 selected as shown in view 1300*b* of FIG. 13. Accordingly, as shown in view 1300*b*, the electronic device 101 may transparently display the uppermost sub child window 1330, exposing a portion of the child window 1320. Thus, the user may identify the overlapping area of the child window 1320 which is hidden by the sub child window 1330.

Meanwhile, as shown in view 1300*b*, as the sub child window 1330 is triggered on the child window 1320 and transparently displayed, the user may select an additional window for adjusting the transparency using a multitouch in a state in which the overlapping area of the child window 1320 is exposed.

For example, as shown in view 1300*c* of FIG. 13, an additional predetermined type of user input 1325 may be detected on the main window 1310 in a state in which the predetermined type of user input 1315 lasts/continues on the child window 1320. In this case, since the uppermost sub child window 1330 and the child window 1320 all are transparently displayed as shown in view 1300*c* in the electronic device 101, the overlapping area in the main window 1310 may be shown.

According to an embodiment, when any one of the user inputs 1315 and 1325 is released in a state in which the user inputs 1315 and 1325 last/continue on the child window 1320 and the main window 1310, respectively, it is possible to adjust the transparency of the uppermost window with respect to the area where the user input lasts/continues. For example, if the user input on the main window 1310 is released while the user input on the child window 1320 lasts/continues as shown in view 1300d of FIG. 13, the electronic device 101 may maintain the transparency of the window, i.e., the sub child window 1330, positioned on the child window 1320 where the user input lasts/continues.

As described above, the user may keep touching with two fingers on the respective areas, i.e., one area of the main window 1310 and one area of the child window 1320, and then release the touch with one of the fingers. If the user input on the main window 1310 is released, and the user input on the child window 1320 lasts/continues, the electronic device 101 may stop the transparent display of the child window 1320 and maintain the transparent display of the uppermost sub child window 1330. As such, when a plurality of windows overlap each other, it is possible to selectively display all the windows or some upper windows transparently depending on the window selected by the user.

Figure 14A:
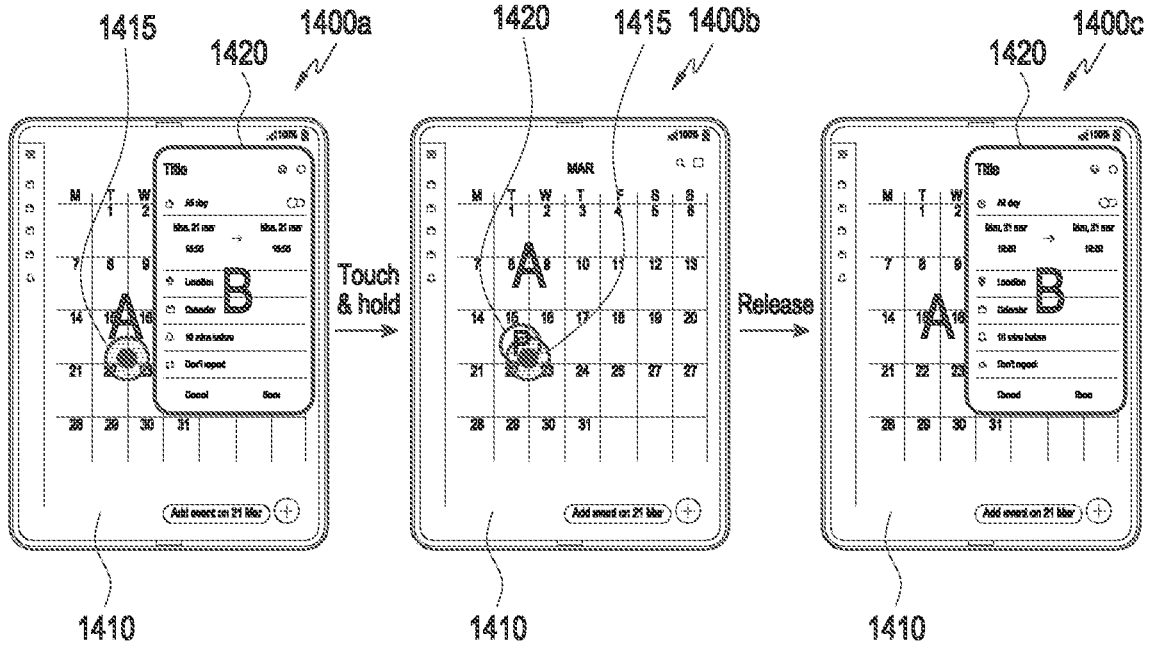
FIG. 14A is a screen example view illustrating a method for adjusting the size of a sub window according to an embodiment.

FIG. 14A is a screen example view illustrating a method for adjusting the size of a sub window according to an embodiment.

Referring to FIG. 14A, as shown in view 1400a, one child window 1420 may be displayed on a main window 1410 of the electronic device 101. When the user is to identify one area of the main window 1410 hidden by the child window 1420, another area of the main window 1410, e.g., an area except for the area hidden by the child window 1420, may be selected. The selection of the area may correspond to a predetermined type of user input.

As shown in view 1400b of FIG. 14A, in response to the selection as user input 1415 of the other area of the main window 1410, the electronic device 101 may temporarily reduce a size of the child window 1420 from a first size to a second size to expose one area of the main window 1410. Here, the child window 1420 as in view 1400b may be moved according to the user input 1415 until before the user input 1415 is released (or terminated). For example, a reduced child window may include a reduced image (e.g., a thumbnail image) of the child window, or other object. For example, as shown in 1400b, the child window 1420 of 1400a may be replaced with an object 1421 having a smaller size than the child window 1420, and thus the object 1421 may be displayed. Because the object 1421 is displayed, the user can visually recognize that a process for the child window 1420 is maintained.

Thereafter, the electronic device 101 may identify whether the predetermined type of user input 1415 is released. If the user input 1415 is released, the electronic device 101 may temporarily stop the shrunken display of the child window 1420 as shown in view 1400c of FIG. 14A. Accordingly, the shrunken child window 1420 may be displayed in the original size as shown in view 1400c.

Figure 14B:
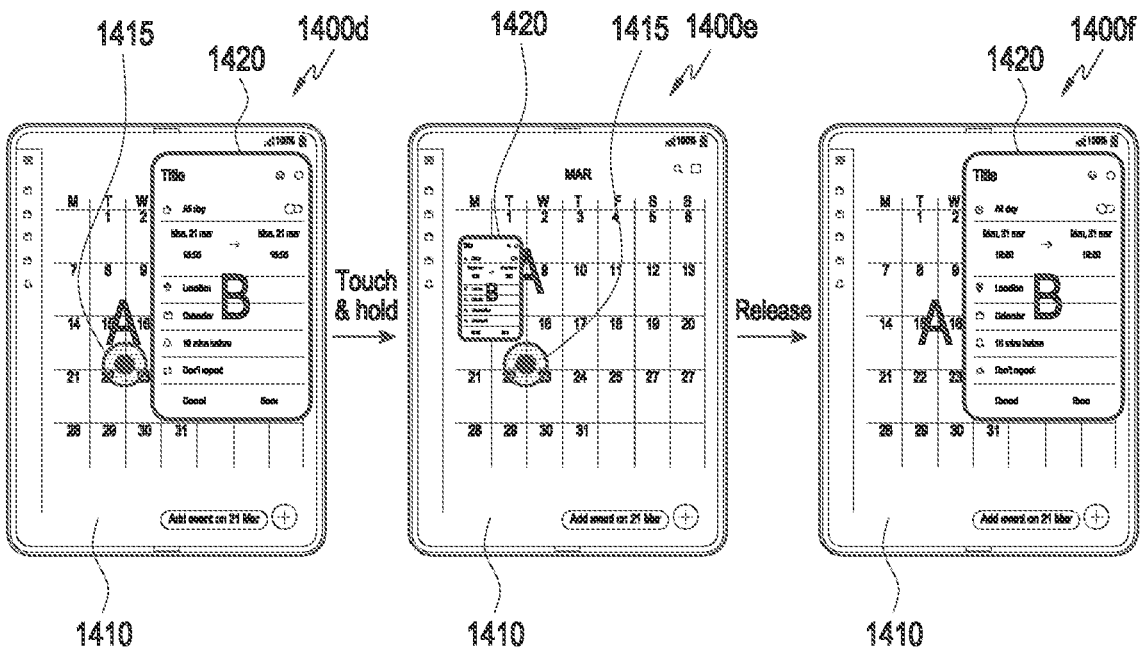
FIG. 14B is a screen example view illustrating a method for adjusting the size of a sub window according to an embodiment.

FIG. 14B is a screen example view illustrating a method for adjusting the size of a sub window according to an embodiment.

As illustrated in 1400d of FIG. 14B, one child window 1420 may be displayed in a first partial area (which may be referred to as "a first part" or "a first portion") on the main window 1410 of the electronic device 101. As shown in 1400e of FIG. 14B, in response to an input 1415 through a second partial area (which may be referred to as "a second part", "a second portion" or "a remaining area except for the first partial area") of the main window 1410, the electronic device 101 may temporarily reduce a size of the child window 1425 from a first size to a second size so that the first partial area of the main window 1410 is visually exposed (which may be referred to as "displayed" or "viewable"). In addition, after determining the size and position of the child window 1420, the electronic device 101 may move the child window 1420 to the another area (e.g., the second partial area) of the main window 1410, as shown in 1400e of FIG. 14B. When the user input 1415 is released, the electronic device 101 may restore the size and position of the child window 1425 of 1400e to the original position and size as shown in 1400f of FIG. 14B.

Although a method for resizing the sub window has been described as an example method for visually exposing the overlapping main window area hidden by the child window, embodiments of the disclosure may not be limited thereto.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

An embodiment of the disclosure may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to an embodiment, a non-volatile storage medium may store instructions configured to, when executed by at least one processor of an electronic device, enable the electronic device to perform at least one operation. The at least one operation may comprise displaying a first window of an application through a display of the electronic device. According to an embodiment, the at least one operation may comprise based on a first input, displaying a second window on a first partial area of the first window to hide the first partial area of the first window. According to an embodiment, the at least one operation may comprise, based on a second input through the first window, displaying the hidden first partial area of the first window. According to an embodiment, the at least one operation may comprise, in response to the second input being released, displaying the second window to hide the first partial area of the first window.

What is claimed is:

1. An electronic device comprising:
   a display;
   at least one processor; and memory storing instructions that, when executed by the at least one processor individually or collectively, cause the electronic device to,
   display a first window of an application through the display, the first window displaying a plurality of items representing a plurality of tasks provided by the application;
   based on a first input to select a first item among the plurality of items on the first window of the application, display a second window over a first partial area of the first window, the second window being associated with at least one task corresponding to the first item among a plurality of tasks of the application;
   based on a second input through the first window, control a transparency of the second window to display both the first partial area of the first window and the second window;
   in response to the second input being released, control the transparency of the second window to display the second window over the first partial area of the first window;
   based on a third input, display a third window over a second partial area of the second window;
   based on a fourth input through the second window, control a transparency of the third window to display both the second partial area of the second window and the third window:
   in response to the fourth input being released, control the transparency of the third window to display the third window over the second partial area of the second window;
   receive simultaneous inputs on both the first window and the second window, and
   based on the simultaneous inputs on both the first and second windows, control a transparency of the second and third windows such that the first partial area of the first window is visually exposed,
   wherein the simultaneous inputs comprise a multitouch on both the first and second windows.

2. The electronic device of claim 1, wherein the instructions cause the electronic device to,
   identify whether the second input continues for a designated period of time or longer, and
   control the transparency of the second window such that the first partial area of the first window is visually exposed while the second input is continuing.

3. The electronic device of claim 2, wherein the instructions cause the electronic device to,
   in response to the second input being released, stop controlling the transparency of the second window.

4. The electronic device of claim 1, wherein the instructions cause the electronic device to,
   reduce a size of the second window from a first size to a second size to display the first partial area of the first window while the second input is continuing, and
   in response to the second input being released, stop displaying the second window in the second size and display the second window in the first size.

5. The electronic device of claim 1, wherein the instructions cause the electronic device to,
   control the transparency of the second and third windows such that the first partial area of the first window is visually exposed while the simultaneous inputs are continuing; and
   in response to the simultaneous inputs being released, stop controlling the transparency of the second and third window.

6. The electronic device of claim 1, wherein the instructions cause the electronic device to, based on the first input to select the first item of the first window, display the second window for inputting content for the first window, obtain content through the second window, and display the obtained content in the first window.

7. The electronic device of claim 1, wherein the second input includes at least one of a long touch, double finger input, touch press, hovering, or designated specific key.

8. A method for controlling display of a multiple window by an electronic device, the method comprising:

displaying a first window of an application through a display of the electronic device, the first window displaying a plurality of items representing a plurality of tasks provided by the application;

based on a first input to select a first item among the plurality of items on the first window of the application, displaying a second window over a first partial area of the first window, the second window being associated with at least one task corresponding to the first item among a plurality of tasks of the application;

based on a second input through the first window, controlling a transparency of the second window to display both the first partial area of the first window and the second window;

in response to the second input being released, controlling the transparency of the second window to display the second window over the first partial area of the first window;

based on a third input, displaying a third window over a second partial area of the second window;

based on a fourth input through the second window, controlling a transparency of the third window to display both the second partial area of the second window and the third window;

in response to the fourth input being released, controlling the transparency of the third window to display the third window over the second partial area of the second window;

receiving simultaneous inputs on both the first window and the second window; and based on the simultaneous inputs on both the first and second windows, controlling a transparency of the second and third windows such that the first partial area of the first window is visually exposed, wherein the simultaneous inputs comprise a multitouch on both the first and second windows.

9. The method of claim 8, wherein controlling the transparency of the second window to display the first partial area of the first window includes, identifying whether the second input continues for a designated period of time or longer; and controlling the transparency of the second window such that the first partial area of the first window is visually exposed while the second input is continuing.

10. The method of claim 9, further comprising stopping controlling the transparency of the second window in response to the second input being released.

11. The method of claim 8, further comprising:

reducing a size of the second window from a first size to a second size to display the first partial area of the first window while the second input is continuing; and stopping displaying the second window in the second size and displaying the second window in the first size in response to the second input being released.

12. The method of claim 8, further comprising: further comprising:

controlling the transparency of the second and third windows such that the first partial area of the first window is visually exposed while the simultaneous inputs are continuing; and in response to the simultaneous inputs being released, stopping controlling the transparency of the second and third windows.

13. The method of claim 8, further comprising:

based on the first input to select the first item of the first window, displaying the second window for inputting content for the first window;

obtaining content through the second window; and displaying the obtained content in the first window.

14. A non-transitory storage medium storing instructions configured to, when executed by at least one processor of an electronic device, enable the electronic device to perform at least one operation, the at least one operation comprising:

displaying a first window of an application through a display of the electronic device the first window displaying a plurality of items representing a plurality of tasks provided by the application;

based on a first input to select a first item among the plurality of items on the first window of the application, displaying a second window over a first partial area of the first window, the second window being associated with at least one task corresponding to the first item among a plurality of tasks of the application;

based on a second input through the first window, controlling a transparency of the second window to display both the first partial area of the first window and the second window;

in response to the second input being released, controlling the transparency of the second window to display the second window over the first partial area of the first window;

based on a third input, displaying a third window over a second partial area of the second window:

based on a fourth input through the second window, controlling a transparency of the third window to display both the second partial area of the second window and the third window;

in response to the fourth input being released, controlling the transparency of the third window to display the third window over the second partial area of the second window;

receiving simultaneous inputs on both the first window and the second window; and based on the simultaneous inputs on both the first and second windows, controlling a transparency of the second and third windows such that the first partial area of the first window is visually exposed, wherein the simultaneous inputs comprise a multitouch on both the first and second windows.

* * * * *